US012492739B2

(12) United States Patent
Dan

(10) Patent No.: US 12,492,739 B2
(45) Date of Patent: Dec. 9, 2025

(54) AUTOMATIC TENSIONER

(71) Applicant: Mitsuboshi Belting Ltd., Kobe (JP)

(72) Inventor: Ryosuke Dan, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/722,259

(22) PCT Filed: Dec. 14, 2022

(86) PCT No.: PCT/JP2022/046108
§ 371 (c)(1),
(2) Date: Jun. 20, 2024

(87) PCT Pub. No.: WO2023/120339
PCT Pub. Date: Jun. 29, 2023

(65) Prior Publication Data
US 2025/0060024 A1  Feb. 20, 2025

(30) Foreign Application Priority Data

Dec. 23, 2021 (JP) ................. 2021-208977
Jan. 21, 2022 (JP) ................. 2022-007842

(51) Int. Cl.
*F16H 7/12* (2006.01)
*F16H 7/08* (2006.01)

(52) U.S. Cl.
CPC ......... *F16H 7/1218* (2013.01); *F16H 7/0831* (2013.01); *F16H 2007/081* (2013.01);
(Continued)

(58) Field of Classification Search
CPC ............. F16H 7/1218; F16H 2007/081; F16H 2007/084; F16H 2007/0893;
(Continued)

(56) References Cited

U.S. PATENT DOCUMENTS 5,470,280 A * 11/1995 Ayukawa .............. F16H 7/1218
474/135
5,503,599 A * 4/1996 Brehler ................. F16H 7/1218
474/135
(Continued)

FOREIGN PATENT DOCUMENTS

JP  2009-180245 A  8/2009
JP  2016-121798 A  7/2016
(Continued)

OTHER PUBLICATIONS

Aug. 24, 2023—(TW) Office Action—App No. 111149769.
(Continued)

*Primary Examiner* — Henry Y Liu
(74) *Attorney, Agent, or Firm* — Banner & Witcoff, Ltd.

(57) ABSTRACT

An auto-tensioner includes: a base having a cylindrical part; an arm; a pulley around which a belt is to be wound; a friction member sandwiched between an inner circumferential surface of a cylindrical part and the arm; and a coil spring pressing the friction member against the arm in the axial direction and rotationally biasing the arm in one direction with respect to the base, in which the friction member includes: an arcuate surface, a first locking part, locked to the arm, and inclined with respect to the radial direction so as to face the one direction side as the first locking part goes toward an outside in the radial direction, and a second locking part, and the friction member and the arm include a restricting unit which restricts the friction member from moving toward the one direction side with respect to the arm.

4 Claims, 10 Drawing Sheets

(52) U.S. Cl.
CPC ............ *F16H 2007/0865* (2013.01); *F16H 2007/0893* (2013.01); *F16H 2007/0895* (2013.01)

(58) Field of Classification Search
CPC ......... F16H 2007/0865; F16H 7/0831; F16H 2007/0895; F16H 7/0829; F16H 7/12
USPC ...................................................... 474/135
See application file for complete search history.

(56) References Cited

U.S. PATENT DOCUMENTS

| | | | | |
|---|---|---|---|---|
| 5,632,697 A * | 5/1997 | Serkh | .................... | F16H 7/1218 474/135 |
| 5,647,813 A * | 7/1997 | Serkh | .................... | F16H 7/1218 474/135 |
| 5,803,849 A * | 9/1998 | Ayukawa | .............. | F16H 7/1218 474/135 |
| 5,964,674 A * | 10/1999 | Serkh | .................... | F16H 7/1218 474/135 |
| 6,497,632 B2 * | 12/2002 | Ayukawa | .............. | F16H 7/1218 474/135 |
| 6,565,468 B2 * | 5/2003 | Serkh | .................... | F16H 7/1218 474/135 |
| 6,582,332 B2 * | 6/2003 | Serkh | .................... | F16H 7/1218 474/135 |
| 6,609,988 B1 * | 8/2003 | Liu | ....................... | F16H 7/1218 474/135 |
| 7,819,765 B2 * | 10/2010 | Kawahara | ............ | F16H 7/1281 474/135 |
| 7,985,151 B2 * | 7/2011 | Singer | .................. | F16H 7/1281 474/135 |
| 8,092,328 B2 * | 1/2012 | Dec | ....................... | F16H 7/1218 474/135 |
| 8,118,698 B2 * | 2/2012 | Guhr | .................... | F16H 7/1281 474/135 |
| 8,337,344 B2 * | 12/2012 | Meano | .................. | F16H 7/1218 474/135 |
| 8,545,352 B2 * | 10/2013 | Lannutti | ............... | F16H 7/1218 474/138 |
| 8,562,467 B2 * | 10/2013 | Mennerat | ............. | F16H 7/1218 474/135 |
| 8,617,013 B2 * | 12/2013 | Ferguson | ............. | F16H 7/1218 474/135 |
| 8,678,965 B2 * | 3/2014 | Ishida | .................. | F16H 7/1218 474/113 |
| 8,888,627 B2 * | 11/2014 | Crist | .................... | F16H 7/1218 474/135 |
| 9,005,061 B2 * | 4/2015 | Liebel | .................. | F16H 7/10 474/135 |
| 9,212,731 B2 * | 12/2015 | Lindstrom | ............ | F16H 7/1218 |
| 9,829,081 B2 * | 11/2017 | Jiang | .................... | F16H 7/1218 |
| 9,982,760 B2 * | 5/2018 | Jiang | .................... | F16H 7/1218 |
| 9,982,761 B2 * | 5/2018 | Ma | ........................ | F16H 7/0829 |
| 10,281,014 B2 * | 5/2019 | Oishi | .................... | F16H 7/12 |
| 2002/0010045 A1 * | 1/2002 | Serkh | .................... | F16H 7/1218 474/135 |
| 2003/0153421 A1 * | 8/2003 | Liu | ....................... | F16H 7/1209 474/134 |
| 2003/0216204 A1 * | 11/2003 | Serkh | .................... | F16H 7/1218 474/133 |
| 2006/0079360 A1 * | 4/2006 | Jung | .................... | F16H 7/1218 474/138 |
| 2006/0172837 A1 * | 8/2006 | Quintus | ................ | F16H 7/1281 474/135 |
| 2009/0075768 A1 * | 3/2009 | D'Silva | ................ | F16H 7/1218 474/135 |
| 2009/0181815 A1 * | 7/2009 | Guhr | .................... | F16H 7/1218 474/135 |
| 2010/0105508 A1 * | 4/2010 | Mennerat | ............. | F16H 7/1218 474/135 |
| 2010/0173738 A1 * | 7/2010 | Guhr | .................... | F16H 7/1218 474/135 |
| 2010/0184546 A1 * | 7/2010 | Singer | .................. | F16H 7/1218 474/135 |
| 2011/0201466 A1 * | 8/2011 | Ishida | .................. | F16H 7/1218 474/113 |
| 2011/0294615 A1 * | 12/2011 | Crist | .................... | F16H 7/1218 474/135 |
| 2012/0010034 A1 * | 1/2012 | Gilmer | .................. | F16F 7/06 474/135 |
| 2012/0028744 A1 * | 2/2012 | Hartmann | ............. | F16H 7/1218 474/135 |
| 2012/0058847 A1 * | 3/2012 | Ferguson | ............. | F16H 7/1218 474/135 |
| 2012/0058848 A1 * | 3/2012 | Lannutti | ............... | F16H 7/1218 474/135 |
| 2013/0116073 A1 * | 5/2013 | Liebel | .................. | F16H 7/10 474/135 |
| 2014/0274510 A1 * | 9/2014 | Dutil | .................... | F16H 7/0831 474/135 |
| 2014/0274511 A1 * | 9/2014 | Lannutti | ............... | F16H 7/1218 474/135 |
| 2014/0287860 A1 * | 9/2014 | Ma | ........................ | F16H 7/1218 474/135 |
| 2015/0276024 A1 * | 10/2015 | Jiang | .................... | F16H 7/1218 474/135 |
| 2016/0146313 A1 * | 5/2016 | Ma | ........................ | F16H 7/1218 474/135 |
| 2016/0290448 A1 * | 10/2016 | Jiang | .................... | F16H 7/0831 |
| 2017/0059015 A1 * | 3/2017 | Oishi | .................... | F16H 7/1218 |
| 2020/0208717 A1 | 7/2020 | Oishi | | |

FOREIGN PATENT DOCUMENTS

| | | |
|---|---|---|
| JP | 6162162 B2 | 7/2017 |
| WO | 2015125691 A1 | 8/2015 |

OTHER PUBLICATIONS

Feb. 21, 2023—International Search Report—Intl App PCT/JP2022/046108.
Apr. 24, 2023—(TW) Office Action—App No. 111149769.
May 6, 2025—(AU) Office Action—AU App. 2022418694.
Oct. 6, 2025—(EP) Extended Search Report—App 22911047.3.

* cited by examiner

θ = 70° (WITH RESTRICTING UNIT)

θ = 70° (WITH RESTRICTING UNIT)

θ = 0° (NO RESTRICTING UNIT)

θ = 35° (NO RESTRICTING UNIT)

θ = 90° (NO RESTRICTING UNIT)

AUTOMATIC TENSIONER

CROSS REFERENCE TO RELATED APPLICATIONS

This is a U.S. National Phase application under 35 U.S.C. § 371 of International Application No. PCT/JP2022/046108, filed Dec. 14, 2022, which claims priority to Japanese Application Nos. 2021-208977, filed Dec. 23, 2021, and 2022-007842, filed Jan. 21, 2022, and which was published Under PCT Article 21(2), the entire contents of which are incorporated herein by reference.

TECHNICAL FIELD

The present invention relates to an auto-tensioner for automatically maintaining tension of a belt appropriately.

BACKGROUND ART

For example, in a belt for auxiliary machine drive of an automobile engine, belt tension varies due to rotation fluctuation caused by engine combustion. A belt slip occurs due to such variation in belt tension, and thus a problem such as slip sound or wear occurs. In order to solve this, conventionally, an auto-tensioner has been adopted as a mechanism to suppress the occurrence of belt slip even if belt tension varies.

An auto-tensioner described in Patent Literature 1 includes: a base including a cylindrical part; an arm supported so as to be rotatable with respect to the base; a pulley which is rotatably provided at the arm and around which a belt is to be wound; a friction member sandwiched between an inner circumferential surface of the cylindrical part and the arm in a radial direction of the cylindrical part; and a coil spring which has one end locked to the friction member and the other end locked to the base and is disposed in a state of being compressed in an axial direction of the cylindrical part, thereby pressing the friction member against the arm in the axial direction and rotationally biasing the arm in one direction with respect to the base through the friction member, and the friction member includes an arcuate surface capable of sliding along the inner circumferential surface of the cylindrical part, a first locking part located further toward the one direction side than the arcuate surface in a circumferential direction of the cylindrical part and locked to the arm, and a second locking part locked to the one end of the coil spring further on an outside in the radial direction than the first locking part (described in paragraph [0010] in Patent Literature 1).

In the auto-tensioner described in Patent Literature 1, between the case where belt tension increases and the case where the belt tension decreases, the magnitudes of a frictional force which is generated at a sliding surface of the friction member are different from each other, and thus a asymmetrical damping characteristic depending on a rotational direction of the arm (asymmetric damping characteristic) is achieved. That is, when the belt tension increases, a force that the first locking part of the friction member receives from the arm can be used as a force that presses the arcuate surface of the friction member against the inner circumferential surface of the cylindrical part of the base, so that a relatively large frictional force can be generated to sufficiently damp oscillation of the arm, and when the belt tension decreases, the arcuate surface of the friction member is not pressed against the inner circumferential surface of the cylindrical part of the base by a biasing force of the coil spring in a circumferential direction, so that a relatively small frictional force can be generated to cause the arm to follow the tension variation of the belt (described in paragraphs [0005], [0011], and [0012] in Patent Literature 1).

Since the auto-tensioner described in Patent Literature 1 achieves the above-described asymmetric damping characteristic only by the friction member and the coil spring, the auto-tensioner is light, has a small number of parts, and is easy to be assembled, since the one end portion of the coil spring is locked to the friction member sandwiched in the radial direction between the cylindrical part of the base and the arm, the auto-tensioner can be downsized in the radial direction, and since the second locking part is positioned on an outside in the radial direction than the first locking part, the friction member can be downsized in the circumferential direction (described in paragraph [0013] in Patent Literature 1).

CITATION LIST

Patent Literature

Patent Literature 1: JP6162162B

SUMMARY OF INVENTION

Technical Problem

Even in the auto-tensioner having the asymmetric damping characteristic as in Patent Literature 1, it is necessary to ensure a higher level of damping force when the belt tension increases depending on a use environment (for example, specifications of an automobile engine).

As a countermeasure, it is necessary to avoid increasing the size of the auto-tensioner in the radial direction due to expanding a winding diameter of the coil spring easily to increase an elastic restoring force when the coil spring is torsionally deformed in a diameter expansion direction.

Therefore, as in the auto-tensioner described in Patent Literature 1, it is conceivable to provide an auto-tensioner capable of maintaining a basic structure of the auto-tensioner which has a small number of parts, is light and compact, and has asymmetric damping characteristic, and ensuring a higher level of damping force when the belt tension increases.

Therefore, it is considered that it is sufficient to configure an auto-tensioner such that in a configuration (hereinafter referred to as a configuration S) in which a locking surface (first locking part) of the friction member locked to the arm is inclined with respect to the radial direction so as to face one direction side as the locking surface goes toward an outside in the radial direction, a degree (inclination angle $\theta$) of an inclination of the locking surface (first locking part) of the friction member locked to the arm with respect to the radial direction so as to face the one direction side as the locking surface goes toward the outside in the radial direction is larger, that is, a magnitude of a normal force component (radial direction component of Fr) Fry acting on the inner circumferential surface of the outer cylindrical part of the base in the resultant force Fr of a force Fa received from the arm and a torsional restoring force Fs of the coil spring which acts on the friction member when the belt tension increases is larger, that is, the frictional force (and thus the damping force) generated between the arcuate surface of the friction member and the outer cylindrical part of the base when the belt tension increases is larger.

However, in this configuration (that is, in the configuration (configuration S) in which the inclination angle θ is set in a range of 0°<θ≤90°, when the inclination angle θ is set larger), the friction member may slip out in the one direction when the belt tension decreases. When a state in which the friction member moves to the one direction side with respect to the arm every time the belt tension decreases is repeated, sliding movement of the friction member becomes difficult, and rattling and abnormal wear occur in various portions (particularly the first locking part and the arcuate surface) of the friction member, and as a result, problems such as an unstable damping characteristic (frictional force generated on the sliding surface) or an occurrence of an abnormal noise occur.

Accordingly, an object of the present invention is to provide an auto-tensioner that has a small number of parts, is light and compact, has a asymmetric damping characteristic, and can reliably (stably without a problem) ensure a damping force at a higher level when the belt tension increases.

Solution to Problem

The present invention is an auto-tensioner including:
a base having a cylindrical part;
an arm supported so as to be rotatable with respect to the base;
a pulley which is rotatably provided at the arm and around which a belt is to be wound;
a friction member sandwiched between an inner circumferential surface of the cylindrical part and the arm in a radial direction of the cylindrical part; and
a coil spring which has one end locked to the friction member and the other end locked to the base and is disposed in a state of being compressed in an axial direction of the cylindrical part, thereby pressing the friction member against the arm in the axial direction and rotationally biasing the arm in one direction with respect to the base through the friction member, in which
the friction member includes:
    an arcuate surface capable of sliding along the inner circumferential surface of the cylindrical part,
    a first locking part located further toward the one direction side than the arcuate surface in a circumferential direction of the cylindrical part, locked to the arm, and inclined with respect to the radial direction so as to face the one direction side as the first locking part goes toward an outside in the radial direction, and
    a second locking part locked to the one end of the coil spring further on the outside in the radial direction than the first locking part, and
the friction member and the arm include a restricting unit which restricts the friction member from moving toward the one direction side with respect to the arm.

According to the present configuration (configuration including the restricting unit), in order to reliably ensure the damping force at a higher level when belt tension increases, even if in the auto-tensioner in which the locking surface (first locking part) of the friction member locked to the arm is inclined with respect to the radial direction so as to face the one direction side as the locking surface goes toward the outside in the radial direction, a degree (inclination angle θ) of the inclination of the locking surface (first locking part) of the friction member locked to the arm with respect to the radial direction so as to face the one direction side as the locking surface goes toward the outside in the radial direction is set to be larger, there is no risk of the friction member slipping out in the one direction when the belt tension decreases (it is possible to reliably prevent the locking surface of the friction member locked to the arm from being disengaged from the locking surface of the arm every time the belt tension decreases).

Therefore, although the auto-tensioner has a small number of parts, is light and compact, and has a asymmetric damping characteristic, it is possible to reliably ensure a higher level of the damping force (without causing problems such as unstable damping characteristics or an occurrence of an abnormal noise) when the belt tension increases.

In the auto-tensioner of the present invention, the restricting unit may be configured such that the first locking part of the friction member and a locking surface of the arm mesh with each other.

According to this configuration, the friction member and the arm can be easily assembled without adhesion with an adhesive, fixing with a rivet, or the like, and when the belt tension decreases, the friction member can be reliably restricted from moving in the one direction with respect to the arm (can be immovable).

In the auto-tensioner of the present invention, the restricting unit may be configured such that a side surface portion on the one direction side of the friction member near the first locking part and a protruding piece portion which is formed on the arm and faces the side surface portion are in contact with each other.

According to this configuration, the friction member and the arm can be easily assembled without adhesion with an adhesive, fixing with a rivet, or the like, and when the belt tension decreases, the friction member can be reliably restricted from moving in the one direction with respect to the arm (can be immovable).

In the auto-tensioner of the present invention, the friction member and the arm may be formed such that an inclination angle (θ) representing a degree of an inclination of the first locking part with respect to the radial direction so as to face the one direction side as the first locking part goes toward the outside in the radial direction is in a range of 350 or more to 70° or less.

According to this configuration, there is no risk that an excessive force is applied to the respective locking surfaces of the friction member and the arm when the belt tension increases, causing problems such as deformation of a portion including the locking surfaces, and it is possible to reliably ensure a higher level of the damping force when the belt tension increases.

Advantageous Effects of Invention

It is possible to provide an auto-tensioner that has a small number of parts, is light and compact, has a asymmetric damping characteristic, and can reliably (stably without a problem) ensure a damping force at a higher level when belt tension increases.

Figure 5A:
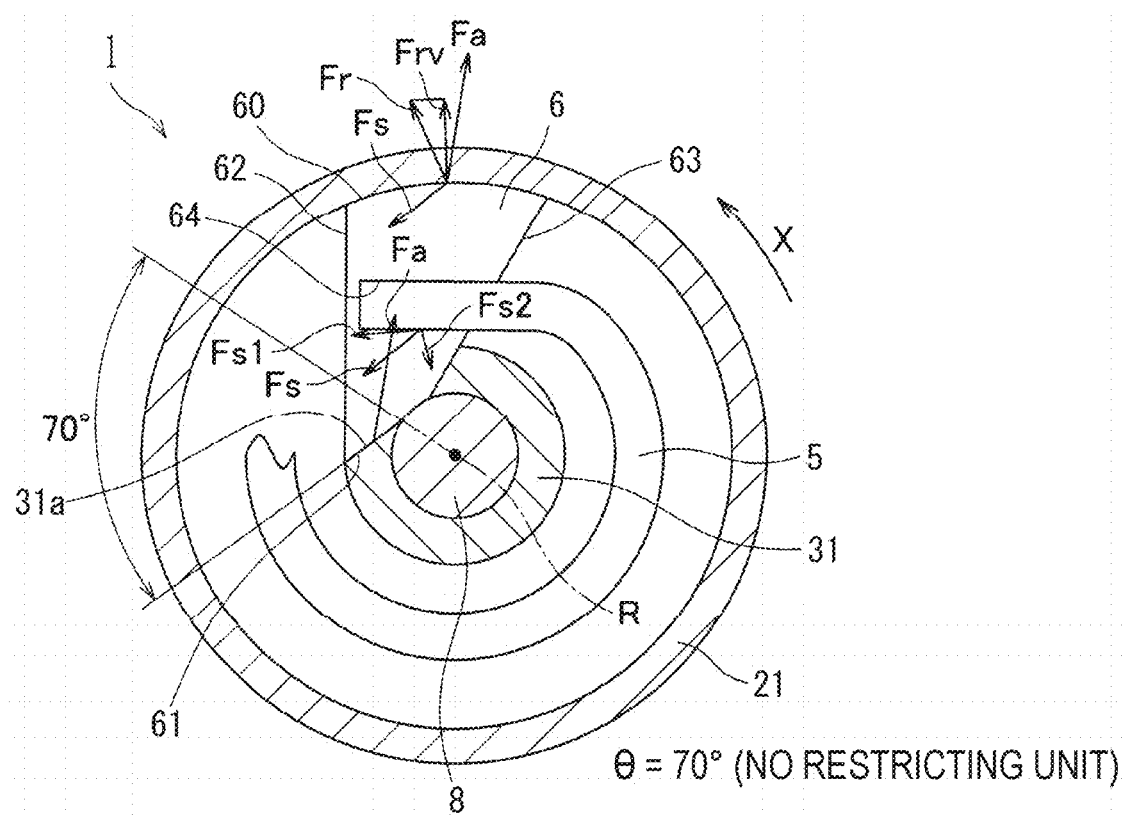
Figure 5B:
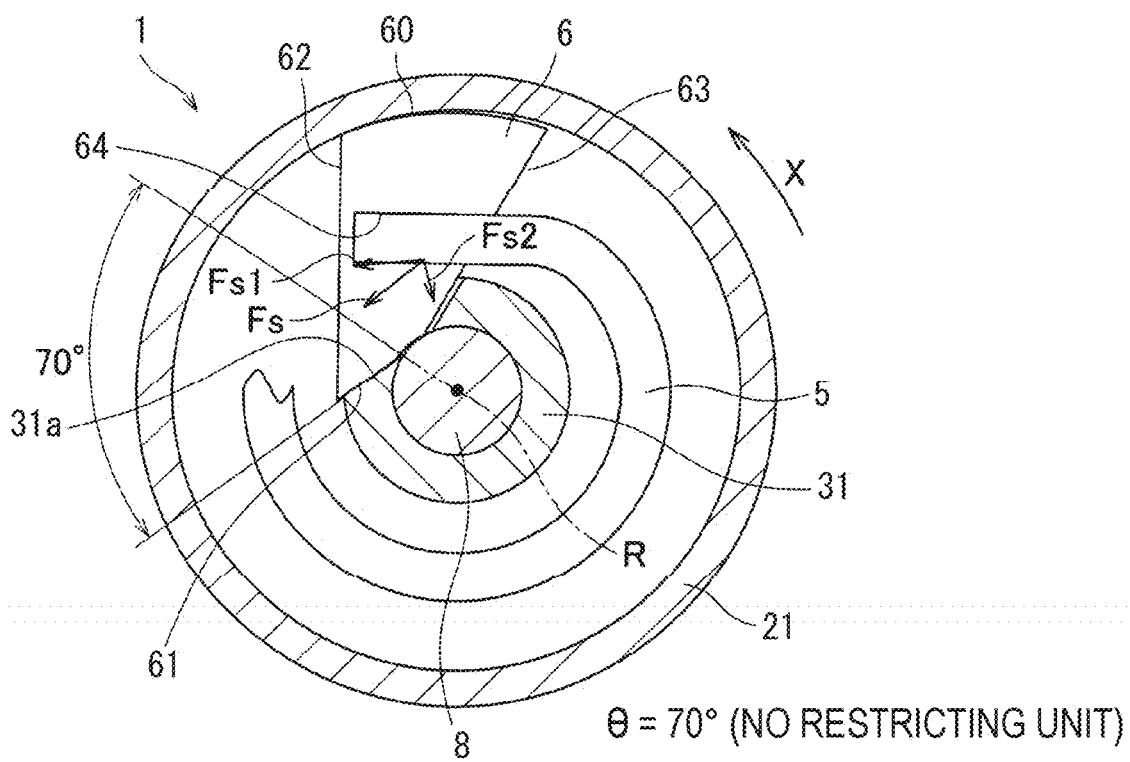

Each of FIGS. 5A and 5B shows a cross-sectional view of an auto-tensioner in which a restricting unit is not provided and an inclination angle θ is set to be 70°.

FIG. 5A is a view showing a force acting on a friction member when the belt tension increases.

FIG. 5B is a view showing a force acting on a friction member when the belt tension decreases, and is a view assuming a state in which the friction member slips out in an X-direction (one direction).

Figure 6:
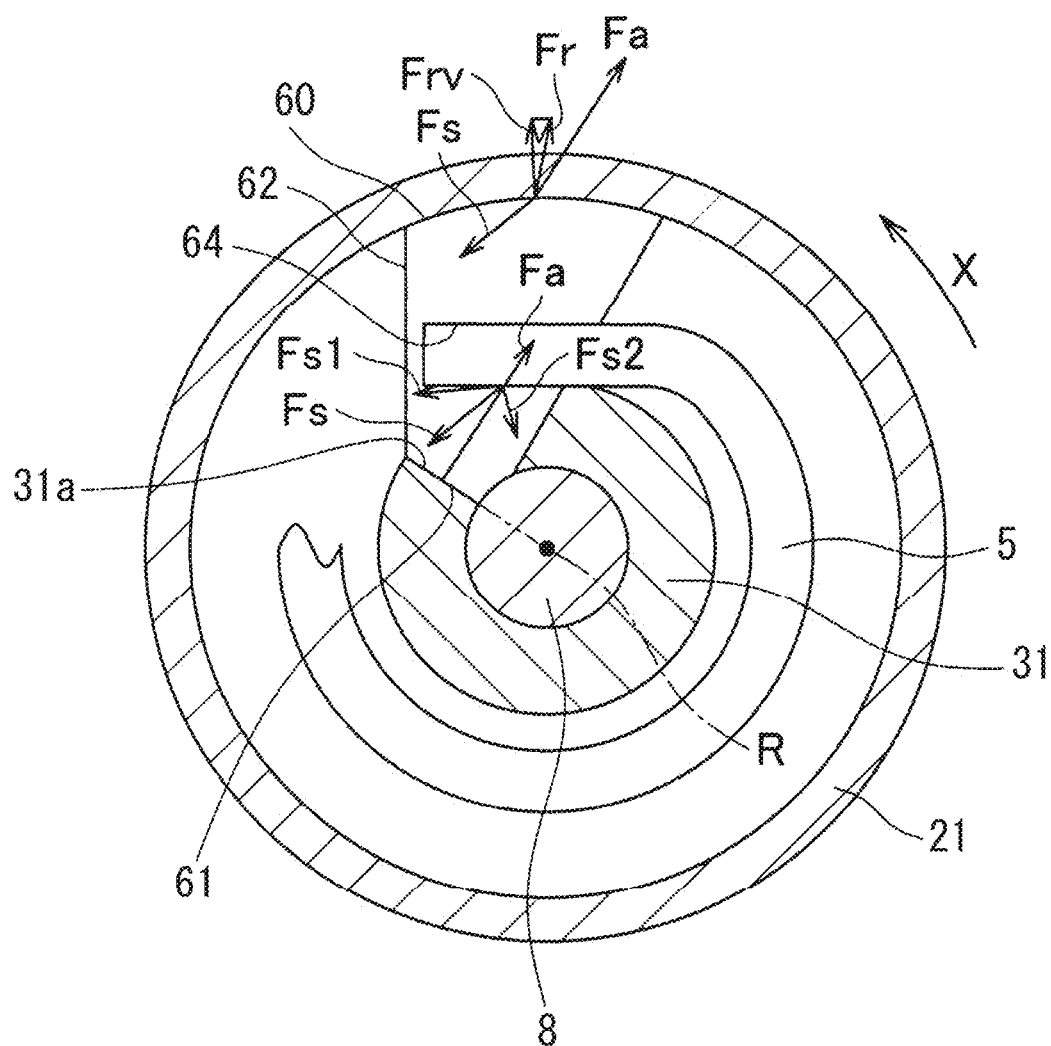

FIG. 6 is a view corresponding to FIG. 5A of the auto-tensioner in which the restricting unit is not provided and the inclination angle θ is set to be 0°.

Figure 7:
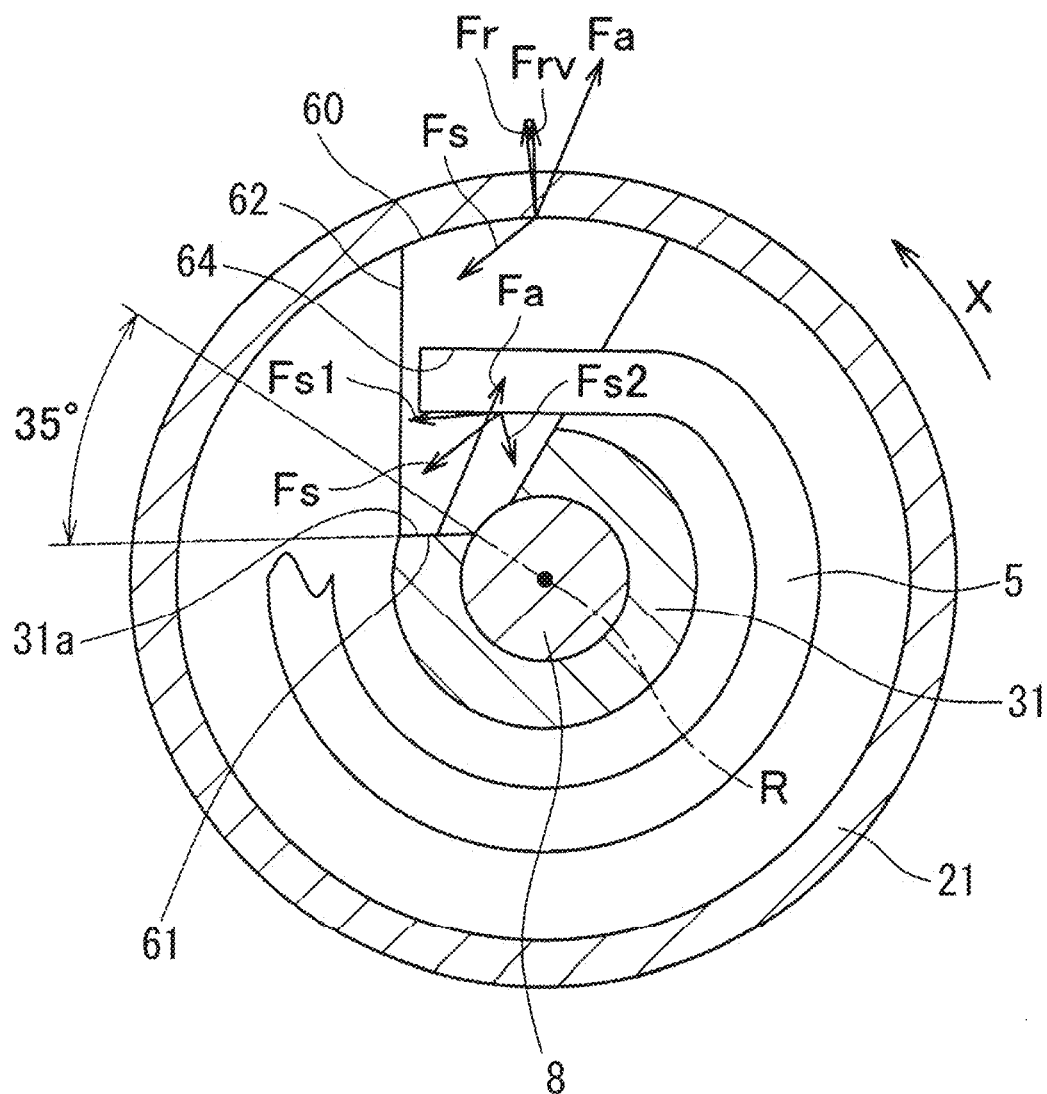

FIG. 7 is a view corresponding to FIG. 5A of the auto-tensioner in which the restricting unit is not provided and the inclination angle θ is set to be 35°.

Figure 8:
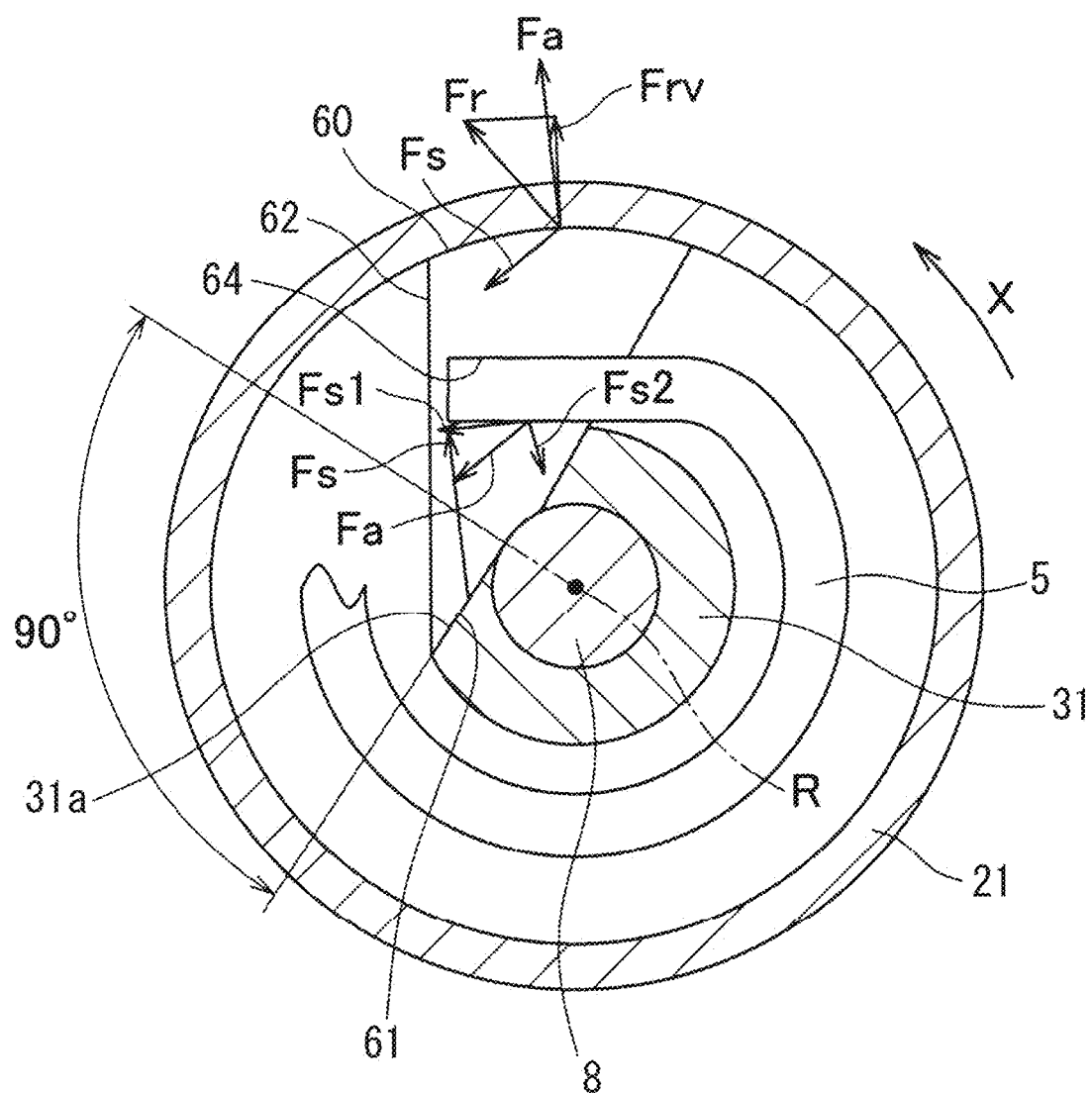

FIG. 8 is a view corresponding to FIG. 5A of the auto-tensioner in which the restricting unit is not provided and the inclination angle θ is set to be 90°.

Figure 9:
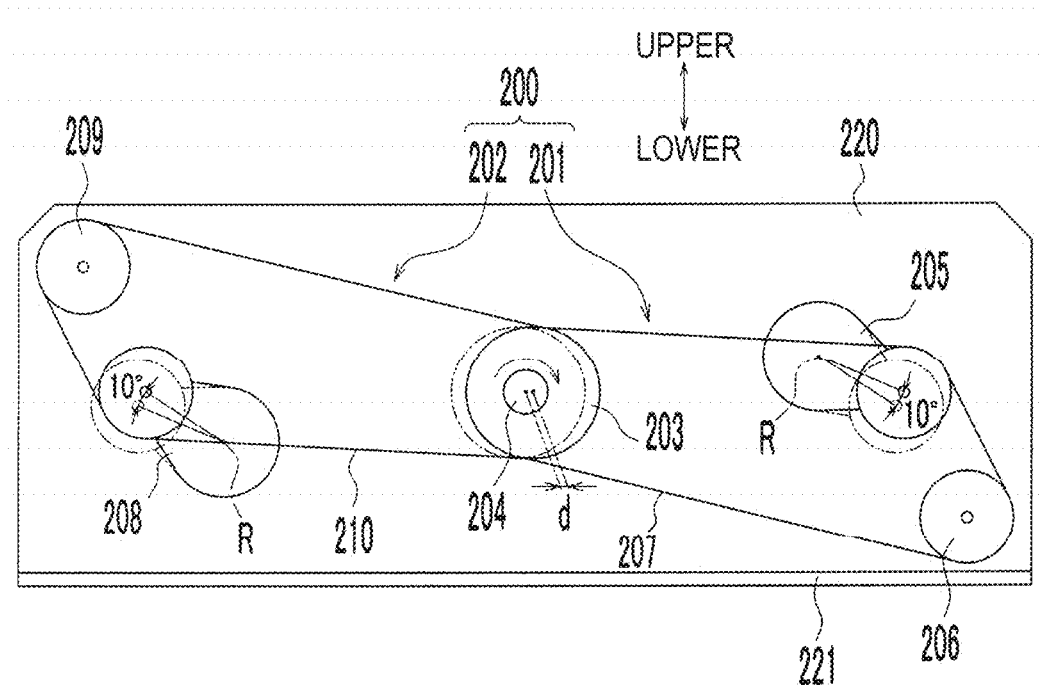

FIG. 9 is a configuration diagram of a test belt system used in a durability test according to Examples.

DESCRIPTION OF EMBODIMENTS

First Embodiment

Next, a first embodiment of the present invention will be described. The present embodiment is an example in which the present invention is applied particularly to an auto-tensioner for maintaining constant loose-side tension of a power-transmission belt 101 which drives an auxiliary machine of an automobile engine.

(Configuration of Auto-Tensioner 1)

An auto-tensioner 1 of the present embodiment is used in an auxiliary machine drive system in which a power-transmission belt is wound around a driving pulley (not illustrated) coupled to a crankshaft of an automobile engine, and a driven pulley (not illustrated) which drives an auxiliary machine such as an alternator. Specifically, a pulley 4, which will be described later, of the auto-tensioner is disposed so as to be into contact with the loose side of the power-transmission belt. This auxiliary machine drive system is made such that the rotation of the crankshaft is transmitted to the driven pulley through the power-transmission belt, whereby the auxiliary machine is driven.

Figure 1:
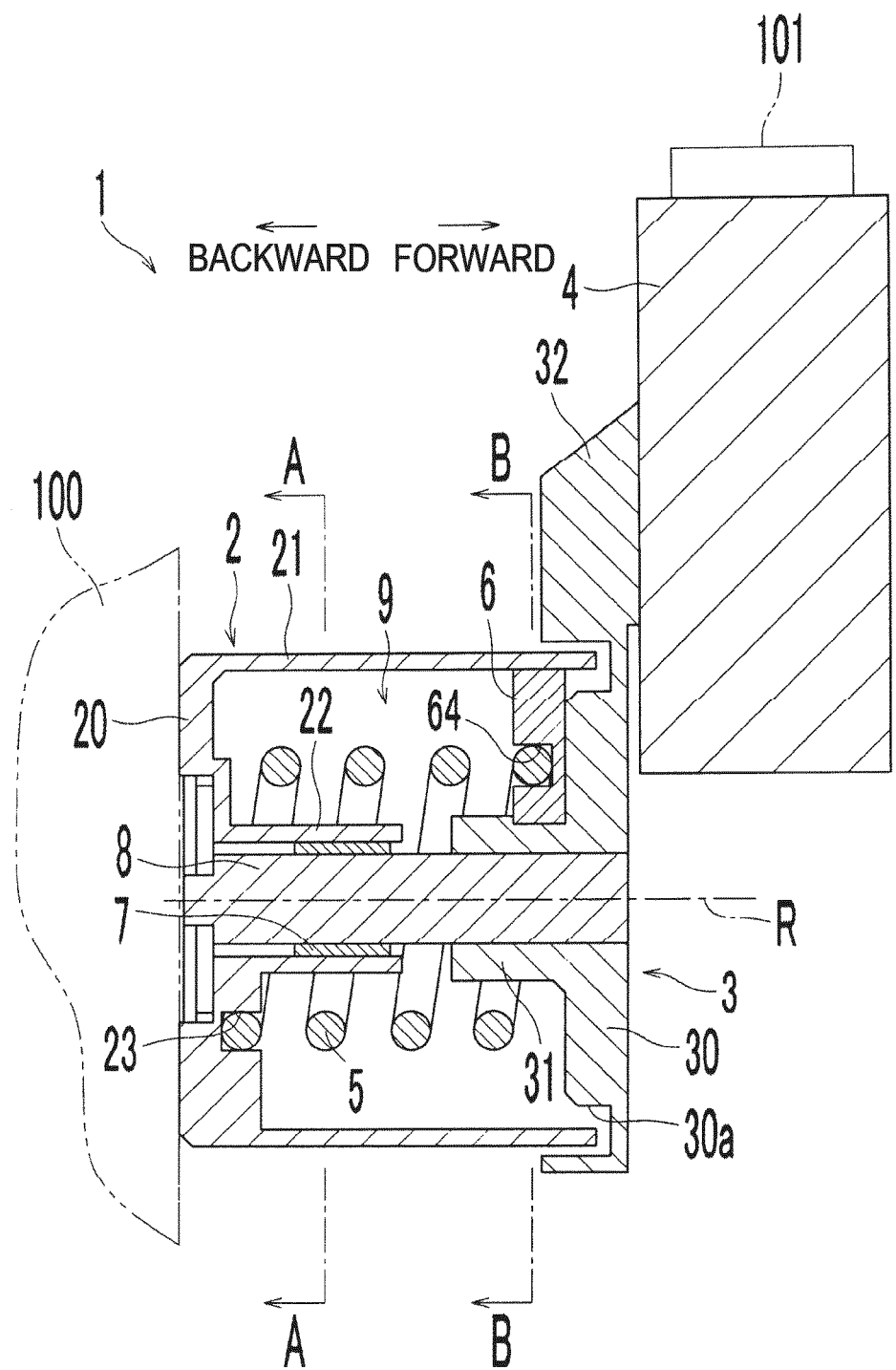
FIG. 1 is a cross-sectional view of an auto-tensioner according to a first embodiment of the present invention.

As illustrated in FIG. 1, the auto-tensioner 1 according to the first embodiment of the present invention is provided with a base 2 which is fixed to an engine block 100 illustrated by a two-dot chain line in FIG. 1, an arm 3 supported so as to be rotatable about an axis R with respect to the base 2, the pulley 4 rotatably provided at the arm 3, a coil spring 5, and a friction member 6. A left-right direction in FIG. 1 is defined as a front-back direction. A radial direction centered on the axis R is defined simply as a radial direction and a circumferential direction around the axis R is defined simply as a circumferential direction.

The base 2 is, for example, a metal part made of an aluminum alloy casting or the like, and is provided with an annular pedestal part 20 which is fixed to the engine block 100, an outer cylindrical part (cylindrical part) 21 extending forward from an outer edge portion of the pedestal part 20, and an inner cylindrical part 22 extending forward from a central portion of the pedestal part 20. A shaft 8 extending in the front-back direction (direction of the axis R) is rotatably inserted inside of the inner cylindrical part 22 with a bearing 7 interposed therebetween.

Figure 2:
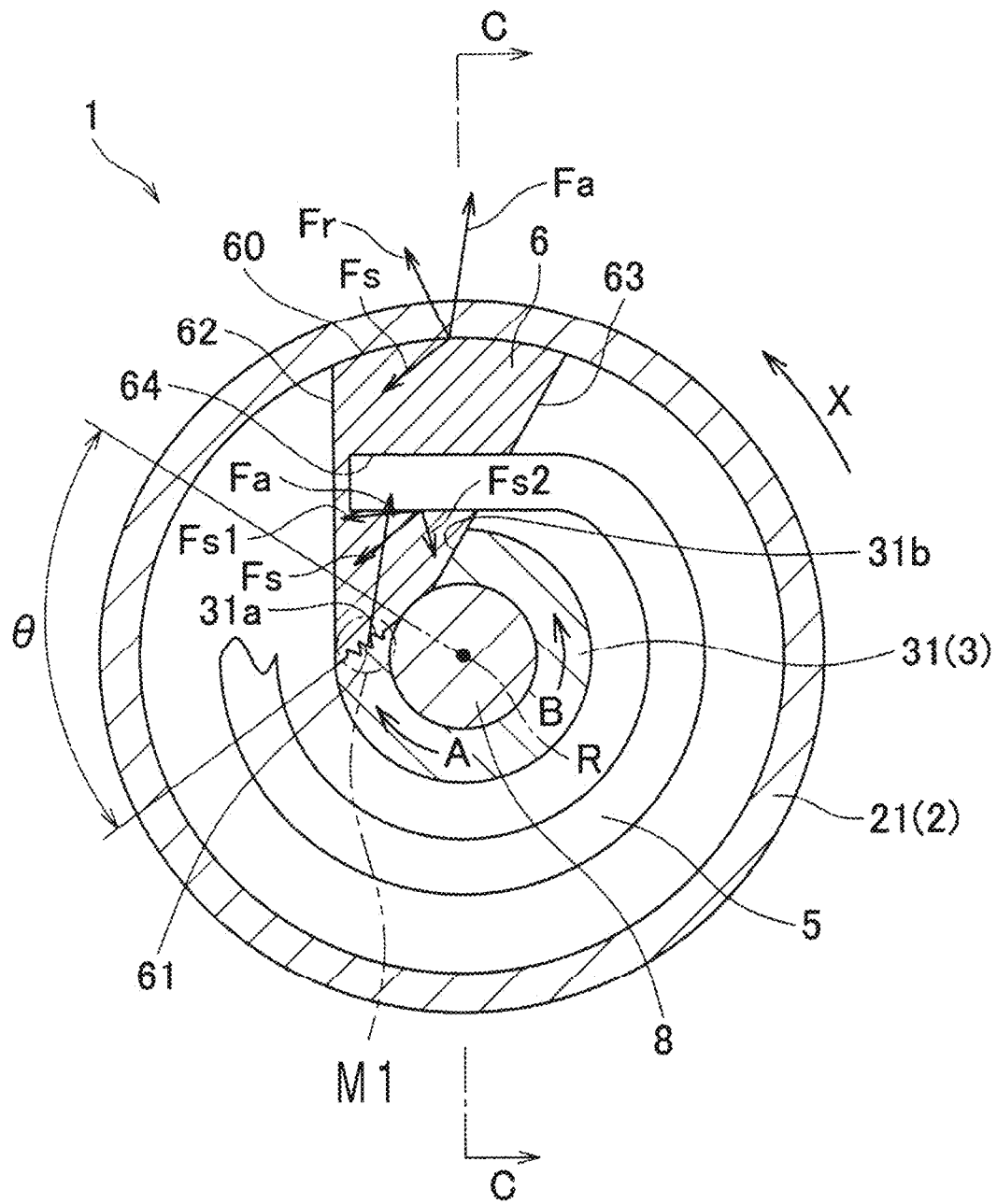
FIG. 2 is a cross-sectional view taken along a line B-B in FIG. 1 (an inclination angle θ is 70°).
Figure 3:
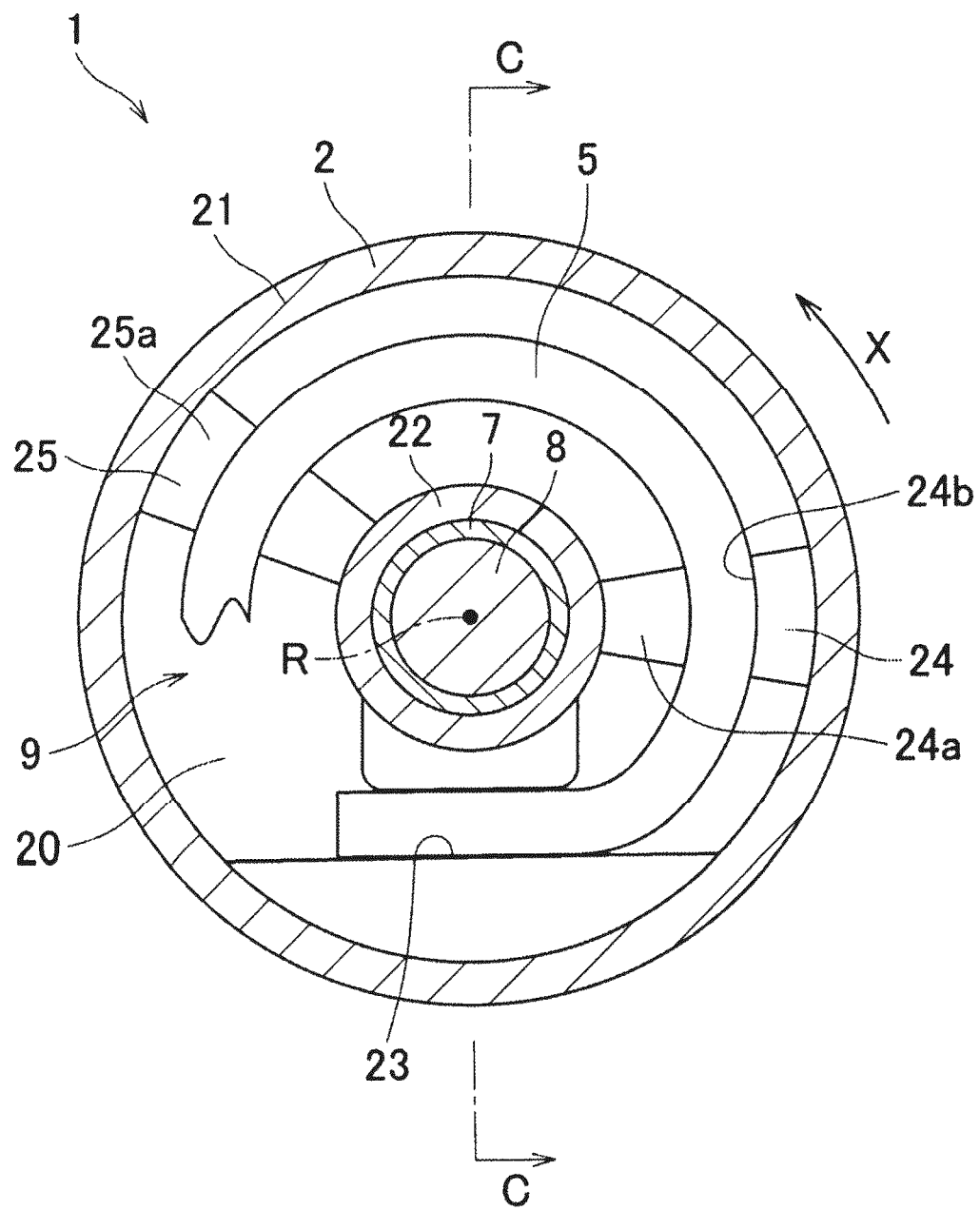
FIG. 3 is a cross-sectional view taken along a line A-A in FIG. 1.

A spring accommodation chamber 9 is formed between the inner cylindrical part 22 and a protrusion portion 31, which will be described later, of the arm 3, and the outer cylindrical part 21. The coil spring 5 is disposed in the spring accommodation chamber 9. As illustrated in FIG. 1 to FIG. 3, the coil spring 5 is coiled in a spiral shape in an X-direction toward a front end portion (one end) from a rear end portion (the other end). FIG. 1 is a cross-sectional view taken along a line C-C illustrated in FIG. 2 and FIG. 3.

As illustrated in FIG. 1 and FIG. 3, a retention groove (end portion retaining unit) 23 which retains (locks) the rear end portion (the other end) of the coil spring 5 is formed in a front surface of the pedestal part 20. The rear end of the coil spring 5 is bent in a direction directed inward in the radial direction in the vicinity of the rear end, and a portion further on the rear end side than the bent portion extends linearly. The linear portion is retained in the retention groove 23. The rear end portion of the coil spring 5 is sandwiched between both side surfaces of the retention groove 23 in the radial direction and is in contact with a bottom surface of the retention groove 23.

Furthermore, a rear end surface of the coil spring 5 is not in contact with any member. However, the vicinity of the bent portion in the linearly extending portion of the rear end portion of the coil spring 5 is held by the retention groove 23 in the radial direction, and therefore, the rear end portion of the coil spring 5 can be prevented from moving by an elastic restoring force due to torsional deformation.

In addition, two posture support parts 24 and 25 protruding forward are formed at intervals in the circumferential direction on the front surface of the pedestal part 20. The posture support parts 24 and 25 are located away from the retention groove 23 in the circumferential direction and are arranged in this order in the X-direction from the retention groove 23. As illustrated in FIG. 3, the posture support part 24 includes an axial direction supporting surface 24a approximately orthogonal to the axis R, and a radial direction supporting surface 24b along the circumferential direction. As illustrated in FIG. 3, the posture support part 25 includes an axial direction supporting surface 25a approximately orthogonal to the axis R.

The rear surface of the coil spring 5 comes into contact with the axial direction supporting surfaces 24a and 25a, and a radially outer surface around the axis R of the coil spring 5 comes into contact with the radial direction supporting surface 24b. Therefore, a portion further on the front end portion side than the portion retained by the retention groove 23 in a first turn region on the rear end side of the coil spring 5 is supported in the axial direction and the radial direction by the two posture support parts 24 and 25. In this way, the coil spring 5 can be stably torsionally deformed.

The arm 3 (rotating member) is provided with a disk part 30 which is disposed in front of the outer cylindrical part 21 of the base 2, the protrusion portion 31 extending rearward from a central portion of the disk part 30, and a pulley support part 32 formed to overhang from a portion of an outer edge of the disk part 30. The arm 3 is also a metal part made of an aluminum alloy casting or the like, similar to the base 2 described above.

A hole extending in the front-back direction is formed in central portions of the disk part 30 and the protrusion portion 31, and the shaft 8 is inserted into the hole so as to be relatively non-rotatable. Therefore, the arm 3 is rotatably supported on the base 2 through the shaft 8.

The pulley 4 is rotatably mounted on the pulley support part 32. The power-transmission belt 101 is wound around the pulley 4. The pulley 4 (and the arm 3) oscillates with the axis R as an oscillation center according to an increase and decrease of the tension of the power-transmission belt 101. In FIG. 1, illustration of an internal structure of the pulley 4 is omitted.

An annular groove 30a in which a front end portion of the outer cylindrical part 21 of the base 2 is accommodated is formed in the vicinity of an outer edge of a rear surface of the disk part 30. In the rear surface of the disk part 30, a portion further on the outside in the radial direction than the protrusion portion 31 and further on the inside in the radial direction than the annular groove 30a is formed in a flat shape perpendicular to the axis R.

The protrusion portion 31 is formed in a substantially cylindrical shape. As illustrated in FIG. 2, a fan-shaped cutout is formed in a front-side portion of the protrusion portion 31. Both sides in the circumferential direction of the cutout are configured as a locking surface 31a and a contact surface 31b. When viewed from the direction of the axis R, the locking surface 31a intersects a straight line passing through any point of the locking surface 31a and the axis R. That is, the locking surface 31a is inclined with respect to the radial direction. More specifically, the locking surface 31a is inclined with respect to the radial direction so as to face in the X-direction as the locking surface 31a goes toward the outside in the radial direction (the details will be described later). Furthermore, the contact surface 31b is inclined with respect to the radial direction so as to face in an opposite direction to the X-direction as the contact surface 31b goes toward the outside in the radial direction.

Here, the locking surface 31a of the protrusion portion 31 of the arm 3 has irregularities that mesh with irregularities formed on a locking surface 61 (first locking part) of the friction member 6 to be described later. Specifically, as shown in FIG. 2, a series of triangular (zigzag) irregularities having a height (length in a direction orthogonal to the locking surface 31a) of 1 mm, a pitch of 1.1 mm, and a pitch number of 3 are formed near a center of the locking surface 31a when viewed from the direction of the axis R. A size, shape, pitch, and the like of the irregularities formed on the locking surface 31a can be freely changed. However, providing irregularities near both ends of the locking surface 31a makes it difficult to ensure a strength of the friction member 6, which should be avoided as much as possible, and as in the present embodiment, it is desirable to provide the irregularities near the center of the locking surface 31a.

The friction member 6 is sandwiched between the inner circumferential surface of the outer cylindrical part 21 of the base 2 and the protrusion portion 31 of the arm 3 in the radial direction. A length in the front-back direction of the friction member 6 is approximately the same as a length in the front-back direction of each of the locking surface 31a and the contact surface 31b. A front surface of the friction member 6 has a flat shape and the whole surface or a portion thereof comes into contact with a rear surface of the disk part 30 of the arm 3.

The friction member 6 is formed by injection molding of a material having high lubricity, which is obtained by mixing a fiber, a filler, a solid lubricant, or the like with synthetic resin. As the synthetic resin that constitutes the friction member 6, for example, thermoplastic resin such as polyamide (Nylon 6T), polyacetal, polytetrafluoroethylene, polyphenylene sulfide, or ultra-high molecular weight polyethylene, or thermosetting resin such as phenol can be used. As long as the front surface and an arcuate surface 60, which will be described later, are formed by the above-described material, the friction member 6 may include a material other than the above-described material.

The friction member 6 has a substantially fan-shaped cross-sectional shape orthogonal to the axis R and includes the arcuate surface 60, the locking surface 61 opposed to the arcuate surface 60, and two side surfaces 62 and 63 opposed to each other in the circumferential direction. The arcuate surface 60 is formed in substantially the same curvature as the inner circumferential surface of the outer cylindrical part 21 and is slidable along the inner circumferential surface of the outer cylindrical part 21. The locking surface 61 (first locking part) comes into contact with the locking surface 31a of the protrusion portion 31 of the arm 3. A radially inner end portion of the side surface 63 on the opposite direction side to the X-direction, out of the two side surfaces 62 and 63, comes into contact with the contact surface 31b of the protrusion portion 31 of the arm 3.

The locking surface 61 is located further toward the X-direction side than the arcuate surface 60 in the circumferential direction. The locking surface 61 is inclined with respect to the radial direction so as to face the X-direction side as the locking surface 61 goes toward the outside in the radial direction. The two side surfaces 62 and 63 are inclined with respect to the radial direction so as to face the opposite direction side to the X-direction as the two side surfaces 62 and 63 go toward the outside in the radial direction.

It is assumed that an inclination angle ($\theta$) (a starting point of the inclination angle ($\theta$) is a contact point between the locking surface 61 and an outer peripheral surface of the shaft 8) representing a degree of an inclination of the locking surface 61 of the friction member 6 with respect to the radial direction so as to face the X-direction side as the locking surface 61 goes toward the outside in the radial direction is in a range of $0°<\theta\leq90°$. Here, the inclination angle ($\theta$) is preferably set in a range of $35°\leq\theta\leq70°$ (see FIG. 2). Regarding the locking surface 31a of the protrusion portion 31 of the arm 3 that contacts the locking surface 61 of the friction member 6, an angle representing a degree of an inclination of the locking surface 31a with respect to the radial direction so as to face the one direction side as the locking surface 31a goes toward the outside in the radial direction is the same as the inclination angle ($\theta$).

A configuration in which the inclination angle ($\theta$) is 0° means that the locking surface 61 of the friction member 6 is formed along the radial direction (radial direction of the cylindrical part 21).

Further, a configuration in which the inclination angle ($\theta$) is 90° means that the locking surface 61 of the friction member 6 is formed along a tangential direction (tangential direction of the cylindrical part 21).

The reason why the inclination angle ($\theta$) is set within a range of $35°\leq\theta\leq70°$ is as follows.

This is because in the case where the inclination angle ($\theta$) is less than 35° (in the case of $0°<\theta<35°$), an effect of reliably ensuring a higher level of a damping force when the belt tension increases is little.

On the other hand, this is because in the case where the inclination angle ($\theta$) exceeds 70° (in the case of $70°<\theta\leq90°$), the damping force can be ensured at an extremely high level when the belt tension increases, but an excessive force is applied to the locking surface 61 of the friction member 6 and the locking surface 31a of the protrusion portion 31 when the belt tension increases, and in the case where the protrusion portion 31 which is a part of the arm 3 is made of an aluminum alloy casting but the friction member 6 is formed of one part made of a synthetic resin, it is considered that although there is no functional problem in the auto-tensioner 1, the vicinity (tapered portion when viewed from the direction of the axis R) of an outer edge of the locking surface 61 of the friction member 6 locked to the arm 3 is deformed.

Therefore, by setting the inclination angle (θ) within the range of 35°≤θ≤70°, there is no risk that the excessive force is applied to the locking surface 61 of the friction member 6 and the locking surface 31*a* of the protrusion portion 31 when the belt tension increases, causing problems such as deformation of the vicinity of the outer edge of the locking surface 61 of the friction member 6 locked to the arm 3, and it is possible to reliably ensure the higher level of the damping force when the belt tension increases.

Further, the locking surface 61 of the friction member 6 has irregularities that mesh with the irregularities formed on the locking surface 31*a* of the protrusion portion 31 described above. Specifically, as shown in FIG. 2, a series of triangular (zigzag) irregularities having a height (length in a direction orthogonal to the locking surface 61) of 1 mm, a pitch of 1.1 mm, and a pitch number of 3 are formed near a center of the locking surface 61 when viewed from the direction of the axis R. A size, shape, pitch, and the like of the irregularities formed on the locking surface 61 can be freely changed. However, providing irregularities near both ends of the locking surface 61 makes it difficult to ensure a strength of the friction member 6, which should be avoided as much as possible, and as in the present embodiment, it is desirable to provide the irregularities near the center of the locking surface 61.

As described above, a configuration in which the irregularities formed on the locking surface 61 of the friction member 6 and the irregularities formed on the locking surface 31*a* of the protrusion portion 31 of the arm 3 mesh with each other serves as a restricting unit that restricts the friction member 6 from moving in the X-direction with respect to the protrusion portion 31 of the arm 3.

A retention groove 64 (second locking part) which retains (locks) the front end portion (one end) of the coil spring 5 is formed in a rear surface of the friction member 6. The front end portion of the coil spring 5 is bent in the vicinity of a tip, similar to the rear end portion, and a portion further on the tip side than the bent portion extends linearly. The linear portion is retained in the retention groove 64. The retention groove 64 is located further toward the outside in the radial direction than the locking surface 61 and is located further toward the opposite direction side to the X-direction than the locking surface 61 in the circumferential direction.

The coil spring 5 is disposed in a state of being compressed in the direction of the axis R (front-back direction). For this reason, the coil spring 5 presses the friction member 6 against the rear surface of the disk part 30 of the arm 3 by an elastic restoring force in the direction of the axis R.

Furthermore, the coil spring 5 is disposed in a state of being twisted in a diameter expansion direction. For this reason, the coil spring 5 rotationally biases the arm 3 through the friction member 6 in the X-direction, that is, a direction of increasing the tension of the power-transmission belt 101 by pressing the pulley 4 against the power-transmission belt 101, by an elastic restoring force in the circumferential direction.

(Operation of Auto-Tensioner 1)

Next, an operation of the auto-tensioner 1 will be described.

In the case where the tension of the power-transmission belt 101 increases, the arm 3 rotates in a direction of an arrow A illustrated in FIG. 2 (opposite direction to the X-direction), against a biasing force in the circumferential direction of the coil spring 5. The friction member 6 rotates in the direction of the arrow A under a force Fa from the locking surface 31*a* of the arm 3, and the arcuate surface 60 of the friction member 6 slides on the inner circumferential surface of the outer cylindrical part 21 of the base 2.

The arcuate surface 60 of the friction member 6 is located further toward the opposite direction side to the X-direction (direction side of the arrow A) in the circumferential direction than the locking surface 61 of the friction member 6. In the present embodiment, a tangential direction at any point of the locking surface 61 and the arcuate surface 60 intersect. The force Fa that the locking surface 61 of the friction member 6 receives from the arm 3 is a force in a tangential direction in the locking surface 61, and therefore, the arcuate surface 60 exists on a straight line in a direction of the force Fa from the locking surface 61. For this reason, the force Fa that the locking surface 61 of the friction member 6 receives from the arm 3 can be used as a force pressing the arcuate surface 60 of the friction member 6 against the inner circumferential surface of the outer cylindrical part 21 of the base 2.

Furthermore, the friction member 6 receives an elastic restoring force (hereinafter referred to as a "torsional restoring force") Fs caused by the torsional deformation in the diameter expansion direction of the coil spring 5. The torsional restoring force Fs is a resultant force of a component force Fs1 in the X-direction and a component force Fs2 in a diameter contraction direction.

Therefore, a resultant force Fr of the force Fa received from the arm 3 and the torsional restoring force Fs of the coil spring 5 acts on the friction member 6. The force Fa is larger than the torsional restoring force Fs, and therefore, the resultant force Fr becomes a radially outward force, and the arcuate surface 60 of the friction member 6 is pressed against the inner circumferential surface of the outer cylindrical part 21 of the base 2 by the resultant force Fr. For this reason, it is possible to generate a large frictional force between the arcuate surface 60 of the friction member 6 and the outer cylindrical part 21 of the base 2, and thus it is possible to generate a large damping force sufficiently damping the oscillation of the arm 3.

Conversely, in the case where the tension of the power-transmission belt 101 decreases, the arm 3 rotates in a direction of an arrow B illustrated in FIG. 2 (the same direction as the X-direction) due to the torsional restoring force Fs of the coil spring 5, and thus the pulley 4 oscillates so as to restore the belt tension. The friction member 6 rotates in the direction of the arrow B under the torsional restoring force Fs from the coil spring 5, and the arcuate surface 60 of the friction member 6 slides on the inner circumferential surface of the outer cylindrical part 21 of the base 2. The friction member 6 is biased radially inward by the component force Fs2 in the diameter contraction direction of the torsional restoring force Fs, and therefore, the frictional force which is generated between the arcuate surface 60 of the friction member 6 and the inner circumferential surface of the outer cylindrical part 21 of the base 2 is small.

In the case where an end portion on the X-direction side of the arcuate surface 60 extends to the range in the circumferential direction of the locking surface 61, the arcuate surface 60 of the friction member 6 can be pressed against the inner circumferential surface of the outer cylindrical part 21 by the component force Fs1 in the circumferential direction of the torsional restoring force Fs of the coil spring 5. However, in the present embodiment, the arcuate surface 60 of the friction member 6 is located further toward the opposite direction side to the X-direction in the circumferential direction than the locking surface 61 of the friction member 6, and therefore, the arcuate surface 60 of the friction member 6 is not pressed against the inner circumferential surface of the outer cylindrical part 21 by the component force Fs1 in the circumferential direction of the torsional restoring force Fs of the coil spring 5 and an increase in the frictional force between the arcuate surface 60 of the friction member 6 and the inner circumferential surface of the outer cylindrical part 21 can be prevented.

Therefore, a smaller frictional force than that in a case where the arm 3 rotates in the direction of the arrow A is generated between the arcuate surface 60 of the friction member 6 and the inner circumferential surface of the outer cylindrical part 21 of the base 2, and therefore, the arm 3 can sufficiently receive the torsional restoring force of the coil spring 5 and it is possible to make the oscillation of the arm 3 sufficiently follow a decrease in belt tension.

Further, in the present embodiment, when the tension of the power-transmission belt 101 decreases, the irregularities formed on the locking surface 61 of the friction member 6 and the irregularities formed on the locking surface 31*a* of the protrusion portion 31 of the arm 3 mesh with each other (restricting unit M1), and the friction member 6 is restricted from moving in the X-direction with respect to the protrusion portion 31 of the arm 3. Therefore, even when the inclination angle (θ) is set to be 70°, there is no risk that the friction member 6 slips out in the X-direction when the belt tension decreases, and it is possible to prevent damping characteristics from becoming unstable or an abnormal noise from occurring during the operation of the auto-tensioner 1. Therefore, the damping force when the belt tension increases can be reliably (stably without a problem) ensured at a higher level.

Furthermore, in light of the arcuate surface 60 of the friction member 6 being located further toward the opposite direction side to the X-direction than the locking surface 61 and the friction member 6 being biased radially inward by the component force Fs2 in the diameter contraction direction of the torsional restoring force Fs of the coil spring 5, the friction member 6 moves in the circumferential direction by the component force Fs1 in the circumferential direction of the torsional restoring force Fs of the coil spring 5, whereby the locking surface 61 can be prevented from being disengaged from the locking surface 31*a* of the arm 3.

Furthermore, since the auto-tensioner 1 according to the present embodiment achieves an asymmetric damping characteristic by only the friction member 6 and the coil spring 5, the auto-tensioner 1 is light and the number of parts is fewer, whereby assembling is easy. In addition, the front end portion of the coil spring 5 is locked to the friction member 6 sandwiched between the outer cylindrical part 21 of the base 2 and the arm 3 in the radial direction, and therefore, it is not necessary to ensure a large space between the coil spring 5 and the outer cylindrical part 21 of the base 2, and thus the auto-tensioner can be downsized.

In the present embodiment, the arcuate surface 60 of the friction member 6 is formed further toward the opposite direction side to the X-direction than the locking surface 61, and therefore, by forming the retention groove 64 further toward the opposite direction side to the X-direction than the locking surface 61, the friction member 6 can be downsized in the circumferential direction, as compared to a case where the locking surface 61 is formed within the range in the circumferential direction of the retention groove 64.

In the present embodiment, the locking surface 61 of the friction member 6 is inclined with respect to the radial direction so as to face the X-direction side as the locking surface 61 goes toward the outside in the radial direction, and therefore, assembling of the friction member 6 is easy.
(Description of Usefulness of Restricting Unit)

Based on a relationship (proportional relationship) between the inclination angle (θ) and a magnitude of the normal force component Fry acting on the inner circumferential surface of the outer cylindrical part 21 of the base 2 when the belt tension increases, that is, a frictional force (and thus the damping force) generated between the arcuate surface 60 of the friction member 6 and the outer cylindrical part 21 of the base 2 when the belt tension increases, usefulness of the restricting unit will be described.

As shown in FIGS. 5A to 8 (views showing a force acting on the friction member when the belt tension increases or decreases in the auto-tensioner having no restricting unit), in a configuration in which the locking surface of the friction member is inclined with respect to the radial direction so as to face the X-direction (one direction) side as the locking surface goes toward the outside in the radial direction, as the inclination angle (θ) of the locking surface of the friction member increases, the magnitude of the normal force component Fry acting on the inner circumferential surface of the outer cylindrical part of the base increases when the belt tension increases.

For example, the magnitude (index) of the normal force component Fry acting on the inner circumferential surface of the outer cylindrical part of the base is 120 (index) in the configuration in which the inclination angle (θ) of the locking surface of the friction member is 35° (see FIG. 7), 134 (index) in the configuration in which the inclination angle (θ) of the locking surface of the friction member is 70° (FIG. 5A), and 137 (index) in the configuration in which the inclination angle (θ) of the locking surface of the friction member is 90° (FIG. 8), in relative comparison with the case where the magnitude (index) of the normal force component Fry is 100 (index) in a configuration in which the inclination angle (θ) of the locking surface of the friction member is 0° (that is, a configuration in which the inclination angle (θ) of the locking surface of the friction member is formed along the radial direction) (see FIG. 6).

Consequently, as long as a friction coefficient between the arcuate surface of the friction member and the inner circumferential surface of the outer cylindrical part of the base, and the torsional restoring force of the coil spring are the same, it is considered that as the inclination angle (θ) of the locking surface of the friction member increases, the damping force increases when the belt tension increases.

It is considered that as the inclination angle (θ) of the locking surface of the friction member increases, when the belt tension decreases, the friction member moves in the circumferential direction (X-direction side) due to the component force Fs1 in the circumferential direction of the torsional restoring force Fs of the coil spring, and the locking surface of the friction member is easily disengaged from the locking surface of the protrusion portion of the arm (the friction member can easily slip out in the X-direction).

For example, in an auto-tensioner for an auxiliary machine drive belt system of an automobile engine, that is, in an auto-tensioner in which, during belt running, an oscillation width of the arm is approximately 10° or less, and a position of the friction member when the belt tension decreases remains within a range of approximately 5° in the X-direction with the axis R as the oscillation center from a position (reference position) of the friction member at the time when a predetermined initial tension is applied, in the case of a configuration in which the inclination angle θ is set to be 70° but no restricting unit is provided (FIG. 5A), it is considered that every time the belt tension decreases, there is a risk that the friction member may slip out to some extent in the X-direction (one direction) (the locking surface of the friction member that is locked to the locking surface of the protrusion portion of the arm is disengaged from the locking surface of the protrusion portion of the arm) as shown in FIG. 5B.

Therefore, as in the present embodiment, by providing the restricting unit in which the irregularities formed on the locking surface 61 of the friction member 6 and the irregularities formed on the locking surface 31a of the protrusion portion 31 of the arm 3 mesh with each other, even when the inclination angle (θ) is set to be larger, the friction member 6 does not slip out to the one direction side when the belt tension decreases (it is possible to reliably prevent the locking surface 61 of the friction member 6 locked to the locking surface 31a of the protrusion portion 31 of the arm 3 from being disengaged from the locking surface 31a of the protrusion portion 31 of the arm 3 every time the belt tension decreases).

That is, the friction member 6 and the arm 3 can be easily assembled without adhesion with an adhesive, fixing with a rivet, or the like, and when the belt tension decreases, the friction member 6 can be reliably restricted from moving in the X-direction with respect to the arm 3 (can be immovable).

Therefore, although the auto-tensioner 1 has a small number of parts, is light and compact, and has a asymmetric damping characteristic, it is possible to reliably ensure a higher level of the damping force (without causing problems such as unstable damping characteristics or an occurrence of an abnormal noise) when the belt tension increases.

Second Embodiment

Figure 4:
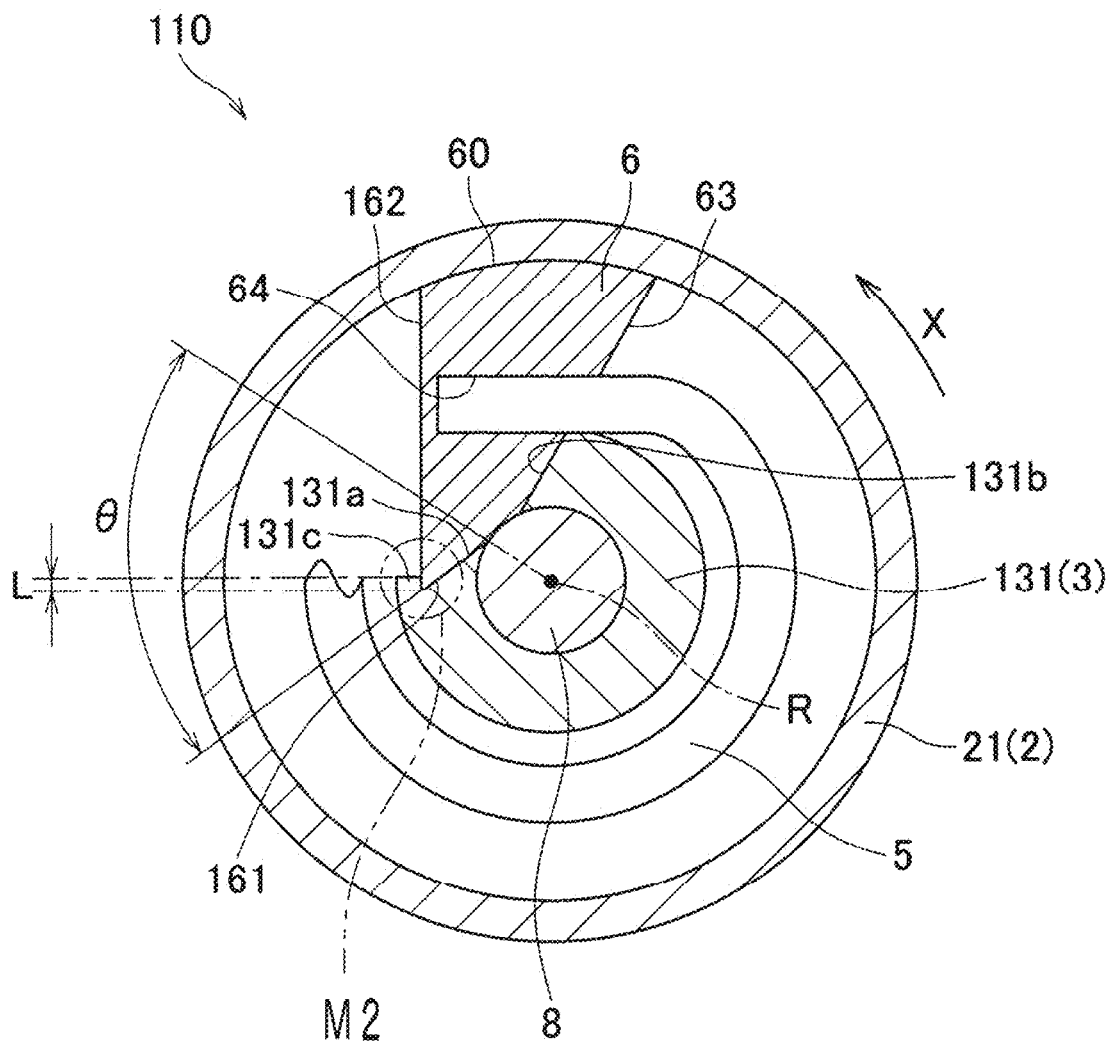
FIG. 4 is a cross-sectional view of an auto-tensioner according to a second embodiment of the present invention (an inclination angle θ is 70°).

In the above first embodiment, the configuration in which the irregularities formed on the locking surface 61 of the friction member 6 and the irregularities formed on the locking surface 31a of the protrusion portion 31 of the arm 3 mesh with each other as the restricting unit that restricts the friction member 6 from moving in the X-direction with respect to the protrusion portion 31 of the arm 3 has been described. As the restricting unit, as shown in FIG. 4, a configuration may be adopted in which an end portion of a side surface 162 (side surface on the X-direction side of the friction member) near the locking surface 161 of the friction member 6 and a protruding piece portion 131c which faces the end portion of the side surface 162 and is formed on a locking surface 131a of a protrusion portion 131 of the arm 3 come into contact with each other.

In this case, the protruding piece portion 131c has a shape extending from the front to the rear of the locking surface 131a of the protrusion portion 131 of the arm 3, and is formed as a part of the protrusion portion 131. Regarding a size of the protruding piece portion 131c, it is desirable that a length in the front-back direction (direction of the axis R) is the same as or slightly longer than a length (thickness) of the friction member 6 in the front-back direction, and a length L (see FIG. 4) in a direction along the side surface 162 on the X-direction side of the friction member 6 is kept at a minimum limit length (for example, about 1 mm to 2 mm) that can achieve both of the ability to reliably restrict the friction member 6 from moving in the X-direction with respect to the arm 3 when the belt tension decreases (the ability to make the friction member 6 immovable) and the ability to reliably ensure the damping force at a higher level when the belt tension increases. This is because, as a length in the direction along a longitudinal direction of the side surface 162 on the X-direction side of the friction member 6 is increased, the magnitude of the normal force component (radial component of Fr) Fry (see FIGS. 5A and 5B) acting on the inner circumferential surface of the outer cylindrical part 21 of the base 2, that is, the frictional force (and thus the damping force) generated between the arcuate surface 60 of the friction member 6 and the outer cylindrical part 21 of the base 2 decreases when the belt tension increases.

In the present embodiment, when the tension of the power-transmission belt 101 decreases, the end portion of the side surface 162 of the friction member 6 comes into contact with the protruding piece portion 131c formed on the locking surface 131a of the protrusion portion 131 of the arm 3 (restricting unit M2) to restrict the friction member 6 from moving in the X-direction, and therefore, even when the inclination angle (θ) is set to be 70°, the friction member 6 does not slip out in the X-direction when the belt tension decreases, and it is possible to prevent the damping characteristics from becoming unstable or the abnormal noise from occurring during the operation of the auto-tensioner 110. Therefore, the damping force when the belt tension increases can be reliably (stably without a problem) ensured at a higher level.

Other Embodiments (1) In the above embodiment, the case has been described in detail in which the inclination angle (θ) representing the degree of the inclination of the locking surface 61 of the friction member 6 with respect to the radial direction so as to face the X-direction side as the locking surface 61 goes toward the outside in the radial direction is in the range of 35°≤θ≤70°, and since it is sufficient that the locking surface 61 of the friction member 6 is inclined with respect to the radial direction so as to face the X-direction side as the locking surface 61 goes toward the outside in the radial direction, the inclination angle (θ) may be provided within the range of 0°<θ≤90°.

(2) In the above embodiment, the friction member is formed by one part, but the friction member may be formed by two parts.

For example, the friction member 6 may include a first part constituting the arcuate surface 60 and a front surface (that is, a surface continuous with the arcuate surface 60 and in contact with the arm 3 in the axial direction of the friction member 6), and a second part constituting the locking surface 61 and the retention groove 64 (see the third embodiment in Patent Literature 1). In this case, the second part preferably has a higher surface hardness than the first part. For example, the first part may be formed by injection molding a synthetic resin such as a polyamide (nylon 6T), and the second part may be formed by a metal part such as an aluminum alloy casting (ADC12).

In this manner, the locking surface 61 and the retention groove 64 are formed in the second part having a relatively high surface hardness, and therefore, even in a case where a force acting on the locking surface 61 and the retention groove 64 increases with an increase in belt tension, damage to (deformation or depression of) the locking surface 61 and the retention groove 64 can be prevented. Furthermore, since the damage to the locking surface 61 and the retention groove 64 is prevented, an application on a high-load drive system in which large belt tension is required, or achievement of downsizing or the like of the friction member 6 is also possible. The first part constitutes the arcuate surface 60 and the front surface, and is made such that falling-off in the axial direction is prevented.

The first part and the second part respectively have irregularities in the surfaces facing each other and may be formed so as to mesh with each other in the circumferential direction. In this way, the first part and the second part can be disposed so as to be immovable with respect to one another in the circumferential direction even without performing adhesion by an adhesive, fixing by a rivet or the like, and can be easily assembled.

EXAMPLES

In the auto-tensioner of the present invention, it is necessary to reliably ensure the damping force at a higher level (without causing problems such as unstable damping characteristics or an occurrence of an abnormal noise) when the belt tension increases while the auto-tensioner has a small number of parts, is light and compact, and has a asymmetric damping characteristic.

Therefore, in the present Examples, auto-tensioners according to Examples 1 to 12, Reference Examples 1 to 3, and Comparative Examples 1 to 4 (hereinafter, referred to as respective specimens) were produced, a torque measurement test and a durability test were performed, and comparative verification was performed.

Hereinafter, the present invention will be described in more detail based on Examples, but the present invention is not limited to these Examples.

[Specimen]

The specimens (auto-tensioners in Examples 1 to 12, Reference Examples 1 to 3, and Comparative Examples 1 to 4) used in the respective tests have the same configuration except for the presence or absence and the configuration of the restricting unit and the inclination angle of the locking surface (first locking part), which are related to the configurations of the friction member and the arm, as described below, and have a configuration capable of maintaining a basic structure of the auto-tensioner which has a small number of parts, is light and compact, and has a asymmetric damping characteristic as in the auto-tensioner described in Patent Literature 1.

(Friction Member)

The friction member was formed by one part (compared to the case of two parts, which is disadvantageous in ensuring a strength), and was formed by injection molding of a polyamide resin (PA6T).

A central angle of the arcuate surface as viewed in an axial center direction (direction of the axis R) of the oscillation shaft of the friction member is 43°.

The length of the friction member in the front-back direction is about 1.4 times a wire diameter of the coil spring.

(Bearing)

A bearing is a cylindrical metal bearing (so-called metal bearing).

An inner circumferential surface of the bearing in contact with the oscillation shaft is made of a resin composition (low friction material) containing a lubricant of polytetrafluoroethylene.

(Base and Arm)

The base and the arm were formed of an aluminum alloy casting (ADC12).

(Presence or Absence and Configuration of Restricting Unit on Friction Member and Arm: Tables 1 and 2)

As shown in Tables 1 and 2, the auto-tensioners in Examples 1 to 6 had the same configuration as the auto-tensioner in the above first embodiment (see FIG. 2). That is, the restricting unit is provided in which the respective locking surfaces of the friction member and the arm (irregularities formed on the respective locking surfaces) mesh with each other.

The restricting unit (irregularities of the locking surface of the friction member and irregularities formed on the locking surface of the arm) was a series of triangular irregularities having a length of 1 mm (height), a pitch of 1.1 mm, and a pitch number of 3 along the direction orthogonal to the locking surface, near centers of the respective locking surfaces when viewed from the direction of the axis R.

The auto-tensioners in Examples 7 to 12 had the same configuration as the auto-tensioner in the second embodiment (see FIG. 4). That is, the restricting unit is provided in which the end portion of the side surface (side surface on the X-direction side of the friction member) near the locking surface of the friction member and the protruding piece portion which is formed on the locking surface of the arm and faces the end portion of the side surface come into contact with each other.

The protruding piece portion had the same length in the front-back direction (direction of the axis R) as the length (thickness) in the front-back direction of the friction member, and had a length (L dimension: see FIG. 4) of 2 mm in the direction along the side surface on the X-direction side of the friction member.

The auto-tensioners in Reference Examples 1 to 3 and Comparative Examples 1 to 4 had no restricting unit.

(Inclination Angle ($\theta$) of Locking Surfaces Between Friction Member and Arm: Tables 1 and 2)

As shown in Tables 1 and 2, in the auto-tensioners in Examples 1 to 6 and Examples 7 to 12, the friction member and the arm were formed such that the inclination angle ($\theta$) was changed stepwise from a relatively small level to a relatively large level within the range of $0°<\theta\leq90°$ and the inclination angle ($\theta$) was 5°, 30°, 35°, 70°, 75°, or 90°.

In the auto-tensioners in Reference Examples 1 to 3, the friction member and the arm were formed such that the inclination angle ($\theta$) was 0° (reference), 5°, or 30°, and the inclination angle ($\theta$) remained at a relatively small level within the range of $0°<\theta\leq90°$ (level equal to or lower than the inclination angle of the first embodiment described in Patent Literature 1 (estimated to be about 330 from FIG. 4 in Patent Literature 1).

In the auto-tensioners in Comparative Examples 1 to 4, the friction member and the arm were formed such that the inclination angle ($\theta$) was 35°, 70°, 75°, or 90°, and the inclination angle ($\theta$) remained at a relatively large level within the range of $0°<\theta\leq90°$.

[Evaluation on Auto-Tensioner: Item, Method, and Criterion]

For each of the specimens shown in Tables 1 and 2, in order to determine whether an auto-tensioner capable of solving the problem of the present application was obtained, the damping characteristics (width of damping torque, stability of torque curve) and durability (presence or absence of the abnormal noise, a condition of the friction member) were verified.

[Damping Characteristics (Width of Damping Torque and Stability of Torque Curve)]
(Tester)
A torque measuring device was used.
(Test Method)
Every time 10 minutes (initial stage), 1 hour, 100 hours, 200 hours, and 300 hours (target test time) were reached in a test time in the durability test to be described later, the auto-tensioner was removed from the device, and the torque measurement test was performed using the torque measuring device to obtain the torque curve (graph showing a relationship between an arm rotation angle and the damping torque). From this torque curve, the width [N·m] of the damping torque at an angle (hereinafter referred to as the arm rotation angle, for example, 60°) at which the arm is rotated at the time of assembling the coil spring was read, and the stability of the torque curve (whether there is disturbance in the torque curve) was read.

Here, the width [N·m] of the damping torque refers to a value obtained by subtracting the damping torque [N·m] when the belt tension decreases from the damping torque [N·m] when the belt tension increases at any arm rotation angle (for example, 60°).

An evaluation result relating to the width of the damping torque was expressed as an index when the width of the damping torque in the auto-tensioner (Reference Example 1) having the reference inclination angle of 0° was defined as 100 (index).

According to a determination criterion to be described later, only in the auto-tensioner in which determination relating to the damping characteristics (width of the damping torque and stability of the torque curve) was at an acceptable level (determination a and determination b), the auto-tensioner was returned to a tester for the durability test to be described later, and the subsequent durability tests were continued.

(Determination Criterion)
As indices for determining whether the damping force can be reliably ensured at a higher level (particularly, without the damping characteristics becoming unstable) when the belt tension increases, the width of the damping torque (when the value is too small, the damping force cannot be ensured at a higher level when the belt tension increases) and the stability of the torque curve (when the torque curve is disturbed, the damping characteristics becomes unstable) were used.

When the width (index) of the damping torque was 120 or more and the torque curve was not disturbed, it was evaluated that the damping force could be reliably ensured at a higher level (without the damping characteristics becoming unstable) when the belt tension increased, and was determined as a.

When the width (index) of the damping torque was more than 100 but less than 120 and the torque curve was not disturbed, it was evaluated as slightly inferior in terms of ensuring a higher level of damping force (without the damping characteristics becoming unstable) when the belt tension increased, and was determined as b.

When disturbance was observed in the torque curve regardless of the width (index) of the damping torque (even 120 or more), it was evaluated that the damping force could not be reliably ensured at a higher level (without the damping characteristics becoming unstable) when the belt tension increased, and was determined as c.

From the viewpoint of suitability (ensuring the damping characteristics) for an actual use in main applications (for an auxiliary machine drive belt system of an automobile engine), the auto-tensioners determined as a and b were determined to be at the acceptable level.

[Durability (Presence or Absence of Abnormal Noise and Condition of Friction Member)]
(Tester)
In order to perform a test of forcibly oscillating the arm, a test belt system 200 shown in FIG. 9 was used for the test.

The test belt system 200 is fixed to one frame 220 extending vertically upward, and the frame 220 is fixed to a stand 221 fixed to a floor or the like and extending in a substantially horizontal direction. The test belt system 200 includes two belt systems (first belt system 201 and second belt system 202) driven simultaneously by one driving pulley 203.

The two belt systems 201 and 202 share one drive motor including a drive shaft 204 and the one driving pulley 203 connected to the drive shaft. The first belt system 201 includes an auto-tensioner 205, a driven pulley 206, and a belt 207. The second belt system 202 includes an auto-tensioner 208, a driven pulley 209, and a belt 210. Positions of three pulleys of the first belt system 201 and positions of three pulleys of the second belt system 202 are point-symmetrical with respect to an axial center of the drive shaft 204.

The drive shaft 204 was disposed in a direction orthogonal to the frame 220. No auxiliary machine was connected to the driven pulleys 206 and 209. Two peripheral grooves around which the belts 207 and 210 were wound in parallel were provided on an outer peripheral surface of the driving pulley 203 so as to be separated in the axial direction. The driving pulley 203 was a so-called eccentric pulley in which the axial center of the drive shaft 204 was formed at a position away from a center of the driving pulley 203 by a predetermined eccentric amount d when viewed in an axial center direction of the drive shaft 204 so that the arms 3 of the auto-tensioners 205 and 208 could be forcibly oscillated. The eccentric amount d was 4 mm so that the oscillation width of the arm 3 (sliding width of the friction member) was 10°. The belts 207 and 210 were V-ribbed belts (manufactured by Mitsuboshi Belting Ltd.), and had a belt name of 6PK 730 (K-shaped rib, the number of rib ridges in a belt width direction was 6, a belt length (POC) was 730 mm, and a belt width was 21.4 mm). Tension members embedded in the belts 207 and 210 are twisted yarn ropes including polyester cords.

Then, specimens (auto-tensioners) to be attached to the respective auto-tensioners 205 and 208 of the two belt systems 201 and 202 simultaneously driven by the one driving pulley 203 were freely selected (freely combined) from Examples 1 to 12, Reference Examples 1 to 3, and Comparative Examples 1 to 4.

(Test Method)
The test was performed at an ambient temperature of 95° C. The initial tension of the belts 207 and 210 was 330N. After the initial tension was applied and a break-in run was performed (for about 10 seconds), the driving pulley 203 was driven clockwise at a rotation speed of 1200 rpm for 10 minutes, and at that point, it was determined whether the abnormal noise was generated. The presence or absence of the abnormal noise (for example, creaking noise) was confirmed by the auditory sense of an inspector (standing position: 1 m in front of the specimen).

Thereafter, the auto-tensioners (two specimens) were once removed from the device, subjected to the torque measurement test using the torque measuring device described above, and evaluated for the damping characteristics (width of the damping torque and stability of the torque curve), and only the auto-tensioners which were determined to be at the acceptable level (determination a and determination b) were returned to the tester (test belt system 200), and the subsequent durability test was continued.

Thereafter, every time 1 hour, 100 hours, 200 hours, and 300 hours (target test time) were reached in the test time in the durability test, the presence or absence of the abnormal noise was determined, the auto-tensioners (two specimens) were removed from the device, and the torque measurement test using the above-described torque measuring device was repeated. When 300 hours is reached, the friction member is calculated to slide back and forth approximately 20 million times.

Finally, with respect to the auto-tensioner which reached the target test time of 300 hours (corresponding to an actual vehicle life) or the auto-tensioner which was determined to be at a failure level (determination c) in the evaluation of the damping characteristics (width of the damping torque and stability of the torque curve) during the durability test and for which the durability test was stopped, the auto-tensioner was disassembled and the condition (presence or absence of deformation, rattling, and abnormal wear) of the friction member (particularly the locking surface (first locking part) and the arcuate surface) was visually observed.

(Determination Criterion)

As indices for determining whether the damping force can be reliably ensured (especially without causing problems such as an abnormal noise) when the belt tension increases, the presence or absence of the abnormal noise (if the abnormal noise occurs, the auto-tensioner cannot withstand practical use) and the condition of the friction member (if the rattling or the abnormal wear occurs in various portions of the friction member, this results in the occurrence of the abnormal noise or unstable damping characteristics) were used.

When there was no abnormal noise and there was no abnormality in the condition of the friction member (no rattling or abnormal wear on any portion of the friction member), it was evaluated that the damping force could be reliably ensured (without causing problems such as an abnormal noise) when the belt tension increased, and was determined as a.

When there was no abnormal noise and there was no rattling or abnormal wear in any portion of the friction member, but partial deformation occurred, it was evaluated as slightly inferior in terms of reliably ensuring the damping force (without causing problems such as an abnormal noise) when the belt tension increased, and was determined as b.

When the abnormal noise occurred and/or when there was the rattling or the abnormal wear in various portions of the friction member, it was evaluated that the damping force could not be reliably ensured (without causing problems such as an abnormal noise) when the belt tension increased, and was determined as c.

From the viewpoint of suitability (ensuring the durability) for an actual use in main applications (for an auxiliary machine drive belt system of an automobile engine), the auto-tensioners determined as a or b were determined to be at the acceptable level.

(Comprehensive Determination)

A criteria of comprehensive determination (ranking) as an auto-tensioner that can solve the present problem were as follows, based on the results of the determination in the above two test items (damping characteristics and durability).

Rank A: When both of the above test items were determined as a was judged that there was no problem in practical use, and was rated as the best rank.

Rank B: In the above test items, when there was no determination c but even one test item was determined as b, there was no problem in practical use, but it was ranked as slightly inferior.

Rank C: When even one of the test items was determined as c, it was given a rank (fail) which was insufficient as a solution to the present problem.

(Verification Result and Consideration)

[Verification with and without Restricting Unit]

Verification results are shown in Tables 1 and 2.

TABLE 1

| | | Reference Example 1 | Example 1 | Example 7 | Reference Example 2 | Example 2 |
|---|---|---|---|---|---|---|
| Configurations of friction member and arm | Restricting unit (presence or absence and configuration) | Absence | Presence (first embodiment) | Presence (second embodiment) | Absence | Presence (first embodiment) |
| | Inclination angle θ of locking surface (°) | 0 | 5 | 5 | 5 | 30 |
| Evaluation of damping characteristics | Width of damping torque (index) | 100 (Reference) | 103 | 103 | 103 | 117 |
| | Stability of torque curve | No disturbance | No disturbance | No disturbance | No disturbance | No disturbance |
| | Determination | — | b | b | b | b |
| Evaluation of durability | Presence or absence of abnormal noise | Absence | Absence | Absence | Absence | Absence |
| | Condition of friction member | No abnormality (at 300 hours) | No abnormality (at 300 hours) | No abnormality (at 300 hours) | No abnormality (at 300 hours) | No abnormality (at 300 hours) |
| | Determination | a | a | a | a | a |
| Comprehensive determination (rank) | | — | B | B | B | B |

| | | Example 8 | Reference Example 3 | Example 3 | Example 9 | Comparative Example 1 |
|---|---|---|---|---|---|---|
| Configurations of friction member and arm | Restricting unit (presence or absence and configuration) | Presence (second embodiment) | Absence | Presence (first embodiment) | Presence (second embodiment) | Absence |
| | Inclination angle θ of locking surface (°) | 30 | 30 | 35 | 35 | 35 |

TABLE 1-continued

| | | | | | | |
|---|---|---|---|---|---|---|
| Evaluation of damping characteristics | Width of damping torque (index) | 117 | 117 | 120 | 120 | 117 to 120 (at 100 hours) |
| | Stability of torque curve | No disturbance | No disturbance | No disturbance | No disturbance | Having disturbance (at 100 hours) |
| | Determination | b | b | a | a | c |
| Evaluation of durability | Presence or absence of abnormal noise | Absence | Absence | Absence | Absence | Presence (at 100 hours) |
| | Condition of friction member | No abnormality (at 300 hours) | No abnormality (at 300 hours) | No abnormality (at 300 hours) | No abnormality (at 300 hours) | There are rattling and abnormal wear in end portion of arcuate surface in X-direction (at 100 hours) |
| | Determination | a | a | a | a | c |
| Comprehensive determination (rank) | | B | B | A | A | C |

TABLE 2

| | | Example 4 | Example 10 | Comparative Example 2 | Example 5 | Example 11 |
|---|---|---|---|---|---|---|
| Configurations of friction member and arm | Restricting unit (presence or absence and configuration) | Presence (first embodiment) | Presence (second embodiment) | Absence | Presence (first embodiment) | Presence (second embodiment) |
| | Inclination angle θ of locking surface (°) | 70 | 70 | 70 | 75 | 75 |
| Evaluation of damping characteristics | Width of damping torque (index) | 134 | 134 | 127 to 134 (at 10 minutes) | 135 | 135 |
| | Stability of torque curve | No disturbance | No disturbance | Having disturbance (at 10 minutes) | No disturbance | No disturbance |
| | Determination | a | a | c | a | a |
| Evaluation of durability | Presence or absence of abnormal noise | Absence | Absence | Presence (at 10 minutes) | Absence | Absence |
| | Condition of friction member | No abnormality (at 300 hours) | No abnormality (at 300 hours) | There are rattling and abnormal wear in end portion of arcuate surface in X-direction (at 10 minutes) | No abnormality (at 300 hours) | There is no rattling, but there is deformation in vicinity of outer edge of first locking part (at 300 hours) |
| | Determination | a | a | c | a | b |
| Comprehensive determination (rank) | | A | A | C | A | B |

| | | Comparative Example 3 | Example 6 | Example 12 | Comparative Example 4 |
|---|---|---|---|---|---|
| Configurations of friction member and arm | Restricting unit (presence or absence and configuration) | Absence | Presence (first embodiment) | Presence (second embodiment) | Absence |
| | Inclination angle θ of locking surface (°) | 75 | 90 | 90 | 90 |
| Evaluation of damping | Width of damping torque (index) | 127 to 135 (at 10 minutes) | 137 | 137 | 127 to 137 (at 10 minutes) |
| | Stability of torque curve | Having disturbance (at 10 minutes) | No disturbance | No disturbance | Having disturbance (at 10 minutes) |
| characteristics | Determination | C | a | a | C |
| Evaluation of durability | Presence or absence of abnormal noise | Presence (at 10 minutes) | Absence | Absence | Presence (at 10 minutes) |
| | Condition of friction member | There are rattling and abnormal wear in end portion of arcuate surface in X-direction (at 10 minutes) | No abnormality (at 300 hours) | There is no rattling, but there is deformation in vicinity of outer edge of first locking part (at 300 hours) | There are rattling and abnormal wear in end portion of arcuate surface in X-direction (at 10 minutes) |
| | Determination | c | a | b | c |
| Comprehensive determination (rank) | | C | A | B | C |

(Comparison in which Inclination Angle was Varied)

Examples 1 to 6, Reference Examples 1 to 3, and Comparative Examples 1 to 4

In auto-tensioners having the same configuration except for the configuration (inclination angle (θ) and presence or absence of the restricting unit) related to the respective locking surfaces of the friction member and the arm, the inclination angle (θ) of the locking surface was varied, and the auto-tensioners were compared.

It was found that as the inclination angle (θ) increases to 5°, 30°, 35°, 70°, 75°, and 90° with 0° (Reference Example 1) as a reference, the width (index) of the damping torque increased.

In the cases where the inclination angle (θ) was 5° (Examples 1 and 7 and Reference Example 2) and 30° (Examples 2 and 8 and Reference Example 3), the durability (presence or absence of the abnormal noise, and condition of the friction member) was good (determination a) from start to finish up to the target test time of 300 hours regardless of the presence or absence of the restricting unit, and in the damping characteristics (width of the damping torque and stability of the torque curve), no disturbance was observed in the torque curve, but the width (index) of the damping torque was greater than 100 but less than 120, and the determination was b (rank B in the comprehensive determination).

From this result, it can be said that, in the case where the inclination angle (θ) is set to a relatively small level (5° and 30°), regardless of the presence or absence of the restricting unit, the friction member does not slip out in a biasing direction (X-direction) of the coil spring when the belt tension decreases, and there are no problems such as unstable damping characteristics or an occurrence of an abnormal noise, but the auto-tensioner is slightly inferior from the viewpoint of ensuring a higher level of the damping force when the belt tension increases.

In the cases where the inclination angle (θ) was 35° (Examples 3 and 9 and Comparative Example 1) and 70° (Examples 4 and 10 and Comparative Example 2), in the configurations including the restricting unit (Examples 3, 4, 9, and 10), the damping characteristics (width of the damping torque and stability of the torque curve) were determined as a, and the durability (presence or absence of the abnormal noise, and condition of the friction member) was also determined as a (ranked as A in the comprehensive determination), and in the configurations including no the restricting unit (Comparative Examples 1 and 2), the damping characteristics (width of the damping torque and stability of the torque curve) were determined as c, and the durability (presence or absence of the abnormal noise, and the condition of the friction member) was also determined as c (ranked as C in the comprehensive determination).

When the case where the inclination angle (θ) was 35° (Comparative Example 1) and the case where the inclination angle (θ) was 70° (Comparative Example 2) in the configurations including no the restricting unit were compared with each other, in terms of both of the damping characteristics (width of the damping torque and stability of the torque curve) and the durability (presence or absence of the abnormal noise and condition of the friction member), the one having a larger inclination angle (θ) (Comparative Example 2) was determined as c earlier (also ranked as C in the comprehensive determination).

From these results, it can be said that, when the inclination angle (θ) is set to a slightly large level (35° to 70°), by employing the configuration including the restricting unit, there is no risk that the excessive force is applied to the respective locking surfaces of the friction member and the arm when the belt tension increases, causing problems such as deformation of the portion including the locking surfaces, and it is possible to reliably ensure the damping force at a higher level (without causing problems such as unstable damping characteristics or an occurrence of an abnormal noise) when the belt tension increases.

From these results, it is considered that, when the inclination angle (θ) is set to be 35° or more in the configuration including no the restricting unit, as the inclination angle (θ) becomes larger, the friction member more likely slips out in the biasing direction (X-direction) of the coil spring every time the belt tension decreases (state in FIG. 5B). When this is repeated, as the inclination angle (θ) becomes larger, (i) the various portions (particularly the locking surface (first locking part) and the arcuate surface) of the friction member start rattling earlier, and the sliding movement (particularly the movement when changing direction in the circumferential direction) of the friction member lacks smoothness earlier, and (ii) due to the slippage of the friction member, the abnormal wear on the arcuate surface of the friction member (abnormal wear at the end portion of the arcuate surface on the X-direction side) occurs earlier and the wear powder (resin powder) gets caught between the arcuate surface of the friction member and the inner circumferential surface of the outer cylindrical part of the base (sliding surface), causing the friction coefficient of the sliding surface to change earlier.

Therefore (from the i and ii), it can be seen that, in the configuration including no restricting unit, the larger the inclination angle (θ) became, the earlier the damping characteristics became unstable (the torque curve is disturbed and the width of the damping torque becomes unstable) and the abnormal noise (creaking noise) occurred.

In the cases where the inclination angle (θ) was 75° (Examples 5 and 11 and Comparative Example 3) and 90° (Examples 6 and 12 and Comparative Example 4), in the configurations including the restricting unit (Examples 5, 6, 11, and 12), the damping characteristics (width of the damping torque and stability of the torque curve) were determined as a, and the durability (presence or absence of the abnormal noise, and condition of the friction member) was determined as a or b (ranked as A or B in the comprehensive determination), and in the configurations including no the restricting unit (Comparative Examples 3 and 4), the damping characteristics (width of the damping torque and stability of the torque curve) were determined as c, and the durability (presence or absence of the abnormal noise, and condition of the friction member) was also determined as c (ranked as C in the comprehensive determination).

From this result, it can be said that, when the inclination angle (θ) is set to a maximum level (75° to 90°), by employing the configuration including the restricting unit, the excessive force is applied to the respective locking surfaces of the friction member and the arm when the belt tension increases, causing a problem that the portion including the locking surfaces (near the outer edge of the locking surface (first locking part) of the friction member) is deformed, but when the belt tension increases, the damping force can be reliably ensured at a higher level without causing problems such as unstable damping characteristics or an occurrence of an abnormal noise.

From the above results, regarding the level of the inclination angle (θ), it can be said that 35° or more and 70° or less is a preferable range from the viewpoint of ensuring the damping characteristics (width of the damping torque and stability of the torque curve) and the durability (presence or absence of the abnormal noise and condition of the friction member).

Although the present invention has been described in detail with reference to specific embodiments, it is apparent to those skilled in the art that various changes and modifications can be made without departing from the spirit and scope of the present invention.

The present application is based on Japanese Patent Application No. 2021-208977 filed on Dec. 23, 2021 and Japanese Patent Application No. 2022-007842 filed on Jan. 21, 2022, and the content thereof is incorporated herein by reference.

REFERENCE SIGNS LIST

1: auto-tensioner
2: base
3: arm
4: pulley
5: coil spring
6: friction member
20: pedestal part
21: outer cylindrical part
23: retention groove
24, 25: posture support part
31: protrusion portion
31a: locking surface
31b: contact surface
60: arcuate surface
61: locking surface
62, 63: side surface
64: retention groove
M1, M2: restricting unit

The invention claimed is:

1. An auto-tensioner comprising:
a base having a cylindrical part;
an arm supported so as to be rotatable with respect to the base;
a pulley which is rotatably provided at the arm and around which a belt is to be wound;
a friction member sandwiched between an inner circumferential surface of the cylindrical part and the arm in a radial direction of the cylindrical part; and
a coil spring which has one end locked to the friction member and the other end locked to the base and is disposed in a state of being compressed in an axial direction of the cylindrical part, thereby pressing the friction member against the arm in the axial direction and rotationally biasing the arm in one direction with respect to the base through the friction member, wherein
the friction member comprises:
an arcuate surface capable of sliding along the inner circumferential surface of the cylindrical part,
a first locking part located further toward the one direction side than the arcuate surface in a circumferential direction of the cylindrical part, locked to the arm, and inclined with respect to the radial direction so as to face the one direction side as the first locking part goes toward an outside in the radial direction, and
a second locking part locked to the one end of the coil spring further on the outside in the radial direction than the first locking part, and
the friction member and the arm comprise a restricting unit which restricts the friction member from moving toward the one direction side with respect to the arm, and
the restricting unit is configured such that the first locking part of the friction member and a locking surface of the arm mesh with each other.

2. An auto-tensioner comprising:
a base having a cylindrical part;
an arm supported so as to be rotatable with respect to the base;
a pulley which is rotatably provided at the arm and around which a belt is to be wound;
a friction member sandwiched between an inner circumferential surface of the cylindrical part and the arm in a radial direction of the cylindrical part; and
a coil spring which has one end locked to the friction member and the other end locked to the base and is disposed in a state of being compressed in an axial direction of the cylindrical part, thereby pressing the friction member against the arm in the axial direction and rotationally biasing the arm in one direction with respect to the base through the friction member, wherein
the friction member comprises:
an arcuate surface capable of sliding along the inner circumferential surface of the cylindrical part,
a first locking part located further toward the one direction side than the arcuate surface in a circumferential direction of the cylindrical part, locked to the arm, and inclined with respect to the radial direction so as to face the one direction side as the first locking part goes toward an outside in the radial direction, and
a second locking part locked to the one end of the coil spring further on the outside in the radial direction than the first locking part,
the friction member and the arm comprise a restricting unit which restricts the friction member from moving toward the one direction side with respect to the arm, and
the restricting unit is configured such that a side surface portion on the one direction side of the friction member near the first locking part and a protruding piece portion which is formed on the arm and faces the side surface portion are in contact with each other.

3. The auto-tensioner according to claim 1, wherein the friction member and the arm are formed such that an inclination angle ($\theta$) representing a degree of an inclination of the first locking part with respect to the radial direction so as to face the one direction side as the first locking part goes toward the outside in the radial direction is in a range of 35° or more to 70° or less.

4. The auto-tensioner according to claim 2, wherein the friction member and the arm are formed such that an inclination angle ($\theta$) representing a degree of an inclination of the first locking part with respect to the radial direction so as to face the one direction side as the first locking part goes toward the outside in the radial direction is in a range of 35° or more to 70° or less.

* * * * *